United States Patent
Asselin et al.

(10) Patent No.: US 11,467,124 B2
(45) Date of Patent: Oct. 11, 2022

(54) APPARATUS, SYSTEMS AND METHODS FOR IN SITU MEASUREMENT OF AN OXIDATION / REDUCTION POTENTIAL AND PH OF A SOLUTION

(71) Applicant: THE UNIVERSITY OF BRITISH COLUMBIA, Vancouver (CA)

(72) Inventors: Edouard Asselin, Vancouver (CA); Hamidreza Zebardast, Vancouver (CA); Jing Liu, Vancouver (CA)

(73) Assignee: THE UNIVERSITY OF BRITISH COLUMBIA, Vancouver (CA)

( * ) Notice: Subject to any disclaimer, the term of this patent is extended or adjusted under 35 U.S.C. 154(b) by 262 days.

(21) Appl. No.: 16/610,219

(22) PCT Filed: May 2, 2018

(86) PCT No.: PCT/CA2018/050524
§ 371 (c)(1),
(2) Date: Nov. 1, 2019

(87) PCT Pub. No.: WO2018/201251
PCT Pub. Date: Nov. 8, 2018

(65) Prior Publication Data
US 2020/0333289 A1    Oct. 22, 2020

Related U.S. Application Data

(60) Provisional application No. 62/500,358, filed on May 2, 2017.

(51) Int. Cl.
*G01N 27/416*    (2006.01)
(52) U.S. Cl.
CPC ..... *G01N 27/4168* (2013.01); *G01N 27/4165* (2013.01); *G01N 27/4167* (2013.01)

(58) Field of Classification Search
CPC ........... G01N 27/4168; G01N 27/4165; G01N 27/4167
See application file for complete search history.

(56) References Cited

U.S. PATENT DOCUMENTS 5,382,331 A    1/1995  Banks
5,811,255 A    9/1998  Hunter et al.
(Continued)

FOREIGN PATENT DOCUMENTS

CA    2028840    9/1990
EP    2860801    4/2015

OTHER PUBLICATIONS

G. Yue, Speciation of the H2SO4-Fe2(SO4)3-FeSO4-H2O system and development of an expression to predict the redox potential of the Fe3+/Fe2+ couple up to 150° C., Hydrometallurgy 147-148, 2014, p. 196-209. (Year: 2014).*

(Continued)

*Primary Examiner* — Luan V Van
*Assistant Examiner* — Caitlyn Mingyun Sun
(74) *Attorney, Agent, or Firm* — Ballard Spahr LLP

(57) ABSTRACT

Methods for in situ measurement of an oxidation reduction potential (ORP) and pH of a solution comprising iron are provided. The methods comprise measuring a kinetic parameter at an electrode surface of an electrode system comprising a working electrode, a counter electrode and a pseudo-reference electrode, wherein the kinetic parameter is associated with ferric reduction or both ferric reduction and ferrous oxidation and comparing the kinetic parameter to calibration data for the electrode system to determine the ORP and pH of the solution. Also provided are apparatus and systems for in situ measurement of an ORP and pH of a solution comprising iron. The apparatus and systems comprise an electrode system comprising a working electrode, a counter electrode and a pseudo-reference electrode and a (Continued)

detector for measuring a kinetic parameter at an electrode surface of the electrode system.

24 Claims, 21 Drawing Sheets

(56) References Cited

U.S. PATENT DOCUMENTS

| | | | |
|---|---|---|---|
| 6,350,367 B1* | 2/2002 | West | G01N 27/4165 204/400 |
| 2004/0105817 A1* | 6/2004 | Gilat | A61P 15/08 424/9.2 |
| 2008/0179179 A1* | 7/2008 | Hicks | G01N 27/4168 204/164 |
| 2015/0276646 A1* | 10/2015 | Kawde | G01N 27/28 205/782 |
| 2015/0346144 A1* | 12/2015 | Lee | G01N 27/4165 204/412 |
| 2016/0118690 A1* | 4/2016 | Bomkamp | H01M 10/0525 429/332 |
| 2017/0113951 A1* | 4/2017 | Su | C02F 1/469 |

OTHER PUBLICATIONS

Handbook of Environmental Degradation of Materials edited by Myer Kutz, 2nd Edition, Sep. 24, 2012, Chapter 4 Electrochemical Corrosion, p. 87-125. (Year: 2012).*

D. Dreisinger, Copper leaching from primary sulfides: Options for biological and chemical extraction of copper, Hydrometallurgy 2006(83), p. 10-20. (Year: 2006).*

S. Roy, On the Development of Thermo-Kinetic Eh-pH Diagrams, Metallurgical and Materials Transactions B, 2012(43B), p. 1277-83. (Year: 2012).*

International Search Report issued in PCT/CA2018/050524, dated Jul. 17, 2018, 3 pages.

* cited by examiner

APPARATUS, SYSTEMS AND METHODS FOR IN SITU MEASUREMENT OF AN OXIDATION / REDUCTION POTENTIAL AND PH OF A SOLUTION

TECHNICAL FIELD

This disclosure relates to apparatus, systems and methods for in situ measurement of an oxidation/reduction potential and pH of a solution. In particular, the disclosure relates to apparatus, systems and methods for measurement of a kinetic parameter at an electrode surface and comparing this parameter to calibration data.

BACKGROUND

The use of pressure hydrometallurgical reactors, whether they be for gold, copper or zinc, is becoming more common. For example, pressure oxidation (POX) is used to treat the increasing number of refractory gold ores that result in poor gold recovery when subjected to whole-ore direct cyanidation. Typically, these refractory ores consist of sulphides, such as pyrite and arsenopyrite, which encapsulate the submicron-sized gold and render it inaccessible to cyanide. The function of POX is to break down the sulphide, thus liberating the gold for downstream cyanidation. POX is typically operated at high oxygen partial pressures (150 to 700 kPa) and high temperature (approximately 200° C.) in an autoclave. The conditions prevalent in the POX reactor or autoclave are critical to the success of the downstream processing and ultimate gold recovery. In particular, it is very important that sulphide oxidation be controlled to ensure adequate break down of the sulphide minerals and high gold extraction during cyanidation. POX is usually controlled by parameters including particle size, pressure, temperature, density and pH of the slurry in the autoclave. All of these parameters together provide an oxidative condition, which is quantified by the oxidation/reduction potential (ORP) of the slurry. Two variables that are often used for process control are the ORP and pH of the oxidized slurry after discharge from the autoclave. However, this method has the drawback of not reflecting the actual conditions in the autoclave, as the measurement is also a reflection of the significant thermo-chemical changes associated with the cooling process.

The chemistry of the POX process may be represented by the following reaction scheme. Pyrite and arsenopyrite may be completely oxidized to ferric sulphate, arsenic acid and sulphuric acid (Equations (1) and (2)) by oxygen and also, to a certain extent, by ferric.

$$4FeS_2+15O_2+2H_2O \rightarrow 2Fe_2(SO_4)_3+2H_2SO_4 \qquad (1)$$

$$4FeAsS+14O_2+2H_2SO_4+4H_2O \rightarrow 2Fe_2(SO_4)_3+ \\ 4H_3AsO_4 \qquad (2)$$

Other sulphide minerals such as chalcopyrite and pyrrhotite would also be completely oxidized to yield ferric salts and sulphuric acid. The oxidation of sulphides is highly exothermic such that the slurry pulp density must be controlled to maintain the target leach temperatures of 190-230° C. After oxidation, the ferric salts rapidly hydrolyze to form some or all of the following ferric precipitates, depending on process conditions (Equations (3), (4) and (5)):

$$Fe_2(SO_4)_3+3H_2O \rightarrow Fe_2O_3+3H_2SO_4 \text{ (hematite)} \qquad (3)$$

$$Fe_2(SO_4)_3+2H_2O \rightarrow 2Fe(OH)SO_4+H_2SO_4 \text{ (basic ferric sulphate or "BFS")} \qquad (4)$$

$$Fe_2(SO_4)_3+2H_3AsO_4 \rightarrow 2FeAsO_4+3H_2SO_4 \text{ (ferric arsenate)} \qquad (5)$$

Various jarosite and amorphous iron/arsenic containing phases may also precipitate depending on process chemistry. When the oxidation/hydrolysis/precipitation reactions are considered together, both pyrite and arsenopyrite may be net acid generators (Equations (6) and (7), where Equation (6) is shown to produce basic iron sulphate (BFS) for reasons discussed below).

$$4FeS_2+15O_2+6H_2O \rightarrow 4Fe(OH)SO_4+4H_2SO_4 \qquad (6)$$

$$4FeAsS+14O_2+4H_2O \rightarrow 4FeAsO_4+4H_2SO_4 \qquad (7)$$

BFS is not an ideal iron precipitate for many reasons. For example, due to the acid it ties up, it requires the use of lime for neutralization (required prior to cyanidation) rather than the cheaper alternative limestone. The neutralization reaction also produces ferric oxy-hydroxides, which negatively impact the rheological properties of the slurry due to their fine particle size. There are also significant health and safety issues regarding the possibility of hydrogen cyanide (HCN) evolution when BFS is not adequately neutralized. Finally, BFS creates environmental issues as it is thermodynamically unstable and will break down in tailings ponds. While it is possible to operate a POX autoclave at conditions where hematite is favoured, it is often very costly and as a result, industrial autoclaves are generally operated under conditions in which the formation of BFS cannot be avoided.

The extent of sulphide oxidation in POX is of primary concern for downstream gold recovery operations, which clearly relates to the economics of the entire mine-to-metal operation. High degrees of sulphide oxidation generally result in high residual free acid at the autoclave outlet according to Equations (6) and (7). High sulphide oxidation and thus high output acid helps to keep iron in solution and avoids excessive precipitation and scaling in the autoclave. High sulphide oxidation also maintains a high redox potential (a high ferric to ferrous ratio) ensuring continuous oxidation of the feed. However, excessive sulphide oxidation is not desirable for several reasons. For example, sulphide oxidation above 60% may not improve gold recovery but unnecessarily increase: (a) oxygen consumption, (b) the cost of neutralization, and (c) the production of BFS. It is therefore very important to accurately control the extent of oxidation.

The extent of sulphide oxidation can be monitored by autoclave slurry discharge ORP or pH. High sulphide oxidation can lead to high output acid, resulting in pH decreasing to less than 2. Typically, the autoclave slurry discharge ORP is maintained at about 750 mV (versus the standard hydrogen electrode) corresponding to a total ferric to total ferrous ratio of approximately 10:1. However, in cases where BFS is the main ferric product there is a strong possibility that the ferric concentration at the autoclave discharge will be higher than that existing in the last compartment of the autoclave. This is due to the fact that, upon flashing of the slurry, a portion of the BFS will re-dissolve thus releasing ferric. In cases where the feed chemistry to POX (for example, sulphide content) and the extent of oxidation are invariant, this difference between in situ and ex situ measurements would not be a concern as both would be proportional. However, as with virtually all industrial processes of this type, feed mineralogy to POX changes with time. Thus, the desired extent of sulphide oxidation and the related amount of BFS precipitate would change on a weekly if not hourly basis. This makes careful process control of the extent of sulphide oxidation through measurement of slurry discharge ORP or pH virtually impossible. Thus, an in situ ORP and pH measurement system would be beneficial for process control during POX.

The standard laboratory ORP probe works by measuring the potential difference between an inert platinum electrode and a reference electrode. The reference electrode is typically an Ag/AgCl or $Hg/Hg_2Cl_2$ reference couple. These reference electrodes are unstable at elevated temperatures and cannot be used over approximately 130° C. High temperature electrodes must exhibit a stable electrode potential at high temperatures and pressures, they must be chemically and thermodynamically stable, the electrode potential must be relatable to a reference standard and the materials of construction must be stable.

Four methods that may be used to obtain a reference potential at high temperature are an external pressure balanced reference electrode (EPBRE), a flow through reference electrode (FTRE), a yttria stabilized zirconia (YSZ) closed-end tube and a pseudo-reference electrode, all of which involve the measurement of voltage.

An EPBRE is an Ag/AgCl electrode that is located outside the pressure vessel and maintained at 25° C. They operate at system pressure but at a temperature that is safe for the reference. This provides a stable reference potential but must be carefully calibrated because of the ionic diffusion that occurs in the junction tube, due to temperature gradient, between the pressure vessel and the reference electrode. However, these electrodes are not robust. They must be refurbished often (cleaned and new solution put in), they typically employ one or two junction frits which can get clogged and the junction tube in the pressure vessel is prone to getting obscured by bubbles or by solids. These design issues limit the application of EPBRE in industrial settings.

A FTRE consists of chloridized silver wire mounted in a tube. Pressurized and dilute (typically about 0.01 M) NaCl solution is pumped through the tube and across the silver wire into the autoclave at a very slow rate (milliliters per minute). This results in a Ag/AgCl reference couple. The FTRE system removes the issue of ionic diffusion across a temperature gradient as the reference solution flow ensures a constant electrolyte composition in the bridge between the autoclave and the silver electrode. These electrodes are complex in that they require a high-pressure pump to feed the NaCl solution, the chloridized wire requires servicing and the bridge tube can be obscured or clogged by solids. This type of electrode has limited application in industrial settings due to the complexity of the apparatus.

A YSZ closed-end tube is filled with an internal junction of copper/cuprous oxide or nickel/nickel oxide solid mixture. These electrodes may be used as membrane-type pH sensors due to the direct relationship between the conduction of oxygen ions through the ceramic and the pH in the aqueous phase. They are only employed as a reference electrode when the pH of the system is known and constant.

Pseudo-reference electrodes consist of inert electrodes, such as gold, platinum or glassy carbon, whose potential is assumed to be invariant as a function of time. This assumption is not strictly correct but may be accurate under some conditions. For example, when there is a sufficient amount of hydrogen in the system, the pseudo-reference electrode may function as a standard hydrogen electrode. The advantage of a pseudo-reference electrode is that it is simple and robust. However, the potential of a pseudo-reference electrode is meaningless unless it is compared to a reference electrode through previous calibration on the basis that the measured potential changes as a function of solution ORP just the same as the potential on a working electrode would change as a function of ORP. Thus, measuring the potential between a pseudo-reference electrode and a working electrode is not sufficient to provide ORP since they are expected to exhibit proportionally varying potentials as a function of solution potential and no potential difference would be generated by increasing solution potential.

SUMMARY

This disclosure is based in part on the development of apparatus, systems and methods for measuring an in situ oxidation/reduction potential (ORP) of a slurry comprising iron.

In one aspect, the present disclosure provides a method for in situ measurement of an ORP or pH of a solution comprising iron, the method comprising: measuring a kinetic parameter at an electrode surface of an electrode system comprising a working electrode, a counter electrode and a pseudo-reference electrode, wherein the kinetic parameter is associated with ferric reduction or both ferric reduction and ferrous oxidation; and comparing the kinetic parameter to ORP calibration data for the electrode system to determine the ORP of the solution or to pH calibration data for the electrode system to determine the pH of the solution.

In another aspect, the present disclosure provides a system for in situ measurement of an ORP or pH of a solution comprising iron, the system comprising: an electrode system comprising a working electrode, a counter electrode and a pseudo-reference electrode; and a detector for measuring a kinetic parameter at an electrode surface of the electrode system, wherein the kinetic parameter is associated with ferric reduction or both ferric reduction and ferrous oxidation, and wherein the kinetic parameter is for comparison to ORP calibration data for the electrode system to determine the ORP of the solution or to pH calibration data for the electrode system to determine the pH of the solution.

In another aspect, the present disclosure provides an apparatus for in situ measurement of an ORP or pH of a solution comprising iron, the apparatus comprising an electrode system comprising a working electrode, a counter electrode and a pseudo-reference electrode; and a detector for measuring a kinetic parameter at an electrode surface of the electrode system, wherein the kinetic parameter is associated with ferric reduction or both ferric reduction and ferrous oxidation, and wherein the kinetic parameter is for comparison to ORP calibration data for the electrode system to determine the ORP of the solution or to pH calibration data to determine the pH of the solution.

In various embodiments, the kinetic parameter is current. In further embodiments, measuring the current comprises imposing a constant cathodic overpotential on the working electrode. In other embodiments, measuring the current comprises: (a) imposing an anodic overpotential followed by a cathodic overpotential on the working electrode and measuring a ratio of an anodic current to a cathodic current; or (b) imposing a cathodic overpotential followed by an anodic overpotential on the working electrode and measuring a ratio of a cathodic current to an anodic current.

In various embodiments, the kinetic parameter is charge transfer resistance.

In various embodiments, the ORP calibration data is obtained by measuring, for a calibration solution, (a) an ORP with a reference electrode, and (b) the kinetic parameter at the electrode surface of the electrode system, wherein the calibration solution comprises ferric and ferrous iron and at least two calibration solutions with different ratios of ferric to ferrous iron are measured for obtaining the ORP calibration data, and wherein the ORP of the solution corresponds to the ORP of the calibration solution at the same value for the kinetic parameter.

In various embodiments, the reference electrode for measuring the ORP of the calibration solution is an external pressure balanced reference electrode (EPBRE) or a flow through reference electrode (FTRE).

In various embodiments, the pH calibration is obtained by measuring, for a calibration solution at a potential where the kinetic parameter is dependent on a concentration of hydrogen ions in solution, (a) pH, and (b) the kinetic parameter at the electrode surface of the electrode system, wherein the calibration solution comprises sulphuric acid and at least two calibration solutions with the same ratio of ferric to ferrous iron and different sulphuric acid concentrations are measured for obtaining the pH calibration data, and wherein the pH of the solution corresponds to the pH of the calibration solution at the same value for the kinetic parameter.

In various embodiments, the working electrode, the counter electrode and the pseudo-reference electrode each independently comprise a platinum, a gold, a carbon, a palladium or an iridium sensor.

In various embodiments, the working electrode, the counter electrode and the pseudo-reference electrode each comprise a platinum wire sensor.

In various embodiments, the methods disclosed herein further comprise calculating a total soluble iron concentration in the solution using the ORP of the solution.

In various embodiments, the methods disclosed herein further comprise calculating an extent of sulphide oxidation in the solution using the ORP of the solution.

In various embodiments, the solution is a slurry comprising iron. In various embodiments, the slurry is from a pressure oxidation process.

In various embodiments, the solution is at a temperature of about 25° C. to about 230° C. In various embodiments, the systems disclosed herein further comprise a reference electrode for measuring the ORP of the calibration solution for which the kinetic parameter at the electrode surface of the electrode system is also measured to obtain the ORP calibration data, wherein the calibration solution comprises ferric and ferrous iron and at least two calibration solutions with different ratios of ferric to ferrous iron are measured to obtain the ORP calibration data, and wherein the ORP of the solution corresponds to the ORP of the calibration solution at the same value for the kinetic parameter.

In various embodiments, the systems disclosed herein further comprise a pH meter for measuring a pH of the calibration solution for which the kinetic parameter at the electrode surface of the electrode system is also measured, at a potential where the kinetic parameter is dependent on a concentration of hydrogen ions in solution, to obtain the pH calibration data, wherein the calibration solution comprises sulphuric acid and at least two calibration solutions with the same ratio of ferric to ferrous iron and different sulphuric acid concentrations are measured to obtain the pH calibration data, and wherein the pH of the solution corresponds to the pH of the calibration solution at the same value for the kinetic parameter.

In various embodiments, the systems disclosed herein further comprise calculating a total soluble iron concentration in the solution using the ORP of the solution.

In various embodiments, the systems disclosed herein further comprise calculating an extent of sulphide oxidation in the solution using the ORP of the solution.

In various embodiments, the apparatus disclosed herein further comprise a reference electrode for measuring the ORP of a calibration solution for which the kinetic parameter at the electrode surface of the electrode system is also measured to obtain the ORP calibration data, wherein the calibration solution comprises ferric and ferrous iron and at least two calibration solutions with different ratios of ferric to ferrous iron are measured to obtain the ORP calibration data, and wherein the ORP of the solution corresponds to the ORP of the calibration solution at the same value for the kinetic parameter.

In various embodiments, the apparatus disclosed herein further comprise a pH meter for measuring a pH of a calibration solution for which the kinetic parameter at the electrode surface of the electrode system is also measured, at a potential where the kinetic parameter is dependent on a concentration of hydrogen ions in solution, to obtain the pH calibration data, wherein the calibration solution comprises sulphuric acid and at least two calibration solutions with the same ratio of ferric to ferrous iron and different sulphuric acid concentrations are measured to obtain the pH calibration data, and wherein the pH of the solution corresponds to the pH of the calibration solution at the same value for the kinetic parameter.

Other aspects and features of the present invention will become apparent to those ordinarily skilled in the art upon review of the following description of specific embodiments of the invention in conjunction with the accompanying claims.

BRIEF DESCRIPTION OF THE DRAWINGS

In drawings which illustrate embodiments of the invention.

DETAILED DESCRIPTION

Figure 1:
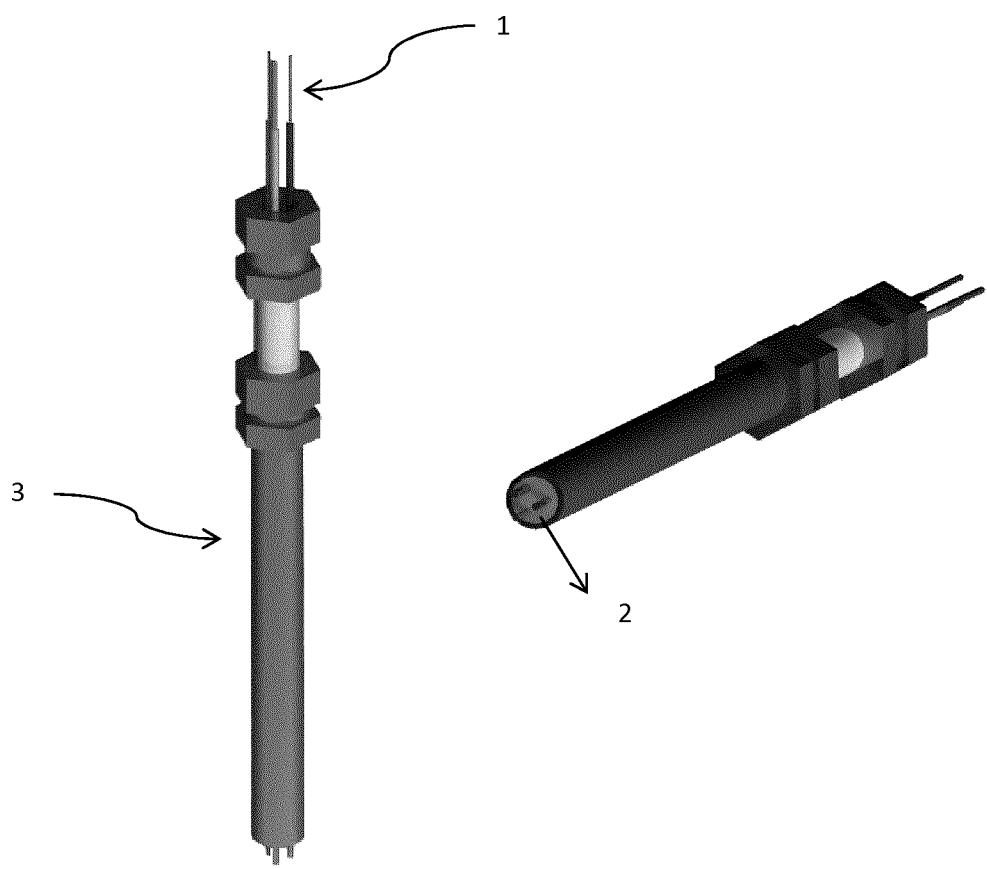
FIG. 1 shows an embodiment of the electrode system disclosed herein, wherein the three platinum electrodes serve individually as a working (or sensing) electrode, counter electrode and pseudo reference electrode, which are then mounted in high temperature, chemically resistant epoxy and housed in a titanium tube.

Any terms not directly defined herein shall be understood to have the meanings commonly associated with them as understood within the art of the invention.

This disclosure provides apparatus, systems and methods for in situ measurement of an oxidation/reduction potential (ORP) and/or pH of a solution comprising iron. A kinetic parameter associated with ferric reduction or both ferric reduction and ferrous oxidation is measured at an electrode surface of an electrode system. In various embodiments, the solution comprising iron may be a slurry. In various embodiments, the solution comprising iron may be a slurry from a pressure oxidation process. The term "slurry" refers to a semi-liquid mixture comprising insoluble particles.

The term "kinetic parameter" is used herein as it is normally understood to a person of ordinary skill in the art and refers to a parameter relating to a speed of reaction occurring at an electrode surface. In various embodiments of the disclosure, the kinetic parameter relates to the speed of reaction of the ferric/ferrous couple at the electrode surface.

The term "electrode system" refers to a working electrode, a counter electrode and a pseudo-reference electrode that are placed in the solution and connected to a device for measuring the kinetic parameter.

In various embodiments, the ORP and pH of the solution is determined by measuring the kinetic parameter. A value of the kinetic parameter is then compared to a calibration plot of ORP as a function of the kinetic parameter in order to obtain the ORP of the solution or to a calibration plot of pH as a function of the kinetic parameter in order to obtain the pH of the solution. ORP calibration data is obtained by preparing calibration solutions of known composition and measuring the ORP of the calibration solutions with a reference electrode such as an EPBRE or FTRE and measuring the kinetic parameter of the calibration solutions using the electrode system. Calibration plots of ORP as a function of kinetic parameter can then be prepared and used for obtaining the ORP of the solution. Calibration data for pH is obtained by measuring the pH of the calibration solutions with a pH meter and measuring the kinetic parameter of the calibration solutions using the electrode system, at a potential wherein the kinetic parameter is dependent on a concentration of hydrogen ions in solution. Calibration plots of pH as a function of kinetic parameter can then be prepared and used for obtaining the pH of the solution.

The operating redox couple in the apparatus, systems and methods disclosed herein is the ferric/ferrous couple. The electrode system is used to measure the kinetic parameter at the surface of one of the electrodes which is transformed into a measure of ORP or pH through calibration. For example, if the kinetic parameter is current, the oxidation or reduction of soluble iron or both the oxidation and reduction of soluble iron in the solution may be measured.

In various embodiments, the ORP calibration comprises the measurement of ORP of a calibration solution with a reference electrode that can measure potential versus the standard hydrogen electrode (SHE) and measurement of the kinetic parameter at the surface of one of the electrodes of the electrode system for the calibration solution. In various embodiments, the calibration solution comprises ferric and ferrous iron and at least two calibration solutions with different ratios of ferric to ferrous iron are measured for obtaining ORP calibration data. The ORP of the solution corresponds to the ORP of the calibration solution at the same value for the kinetic parameter.

In various embodiments, the pH calibration comprises the measurement of pH of a calibration solution with a pH meter and measurement of the kinetic parameter at the surface of one of the electrodes of the electrode system for the calibration solution, at a potential where the kinetic parameter is dependent on a concentration of hydrogen ions in solution. In various embodiments, the calibration solution comprises ferric and ferrous iron and at least two calibration solutions with the same ratio of ferric to ferrous iron and different concentrations of sulphuric acid are measured for obtaining the pH calibration data. The pH of the solution corresponds to the pH of the calibration solution at the same value for the kinetic parameter.

In some embodiments, a constant cathodic overpotential is imposed on the working electrode for a period of a few seconds, and the current passing between the counter and working electrodes is measured. This current density may be referred to as the "characteristic current density" ($i_c$ or $i_{cc}$). If ferric is the potential-determining species present in the solution, then this constant overpotential would result in higher measured current when the solution is more oxidizing. Due to the nearly reversible kinetics of the $Fe^{3+}/Fe^{2+}$ couple, it is likely that ferric will determine ORP even in the autoclave. This measurement is then calibrated to ORP measurements performed with a reference electrode that can measure potential versus the SHE. In other embodiments, as described below, an anodic overpotential followed by a cathodic overpotential are imposed on the working electrode and a ratio of an anodic current to a cathodic current is measured. In further embodiments, a cathodic overpotential followed by an anodic overpotential are imposed on the working electrode and a ratio of cathodic current to anodic current is measured. In various embodiments, the solution for which the kinetic parameter is measured can be at a temperature of about 25° C. to about 230° C., or any temperature therebetween.

In other embodiments, the exchange current density at the working electrode surface may be measured. This current density is proportional to the concentration of the potential-determining species, for example, ferric. This measurement is also then calibrated to ORP measurements performed with a reference electrode that can measure potential versus the SHE or to pH measurements performed with a pH meter.

In various embodiments, each of the electrodes of the electrode system comprises a sensor that is in contact with the solution. The sensor may comprise any unreacting, non-corrodible surface. The sensor of each electrode may independently comprise platinum, gold, carbon, palladium or iridium. In addition to the sensor, each of the electrodes also comprises an electrode body, a pressure sealing mechanism and insulation for providing electrical isolation. In various embodiments, the electrode body may be any relatively inert material such as thermoplastics (for example, PTFE), ceramics (for example, alumina or zirconia) or metals (for example, stainless steels, Ti, Ni alloys, Nb or Ta). In various embodiments, the pressure sealing mechanism may be a high temperature epoxy plug, gland holding ceramic or thermoplastic ferrules, metal ferrules, pipe fittings or any other appropriate seal. The electrical isolation may comprise ceramics or plastics. In various embodiments, the sensor of the three electrodes may each comprise platinum wires. The three platinum wires (1) may be mounted in high temperature, chemically resistant epoxy (2) and housed in a titanium tube (3) as shown in FIG. 1. In other embodiments, the electrode system comprises a glassy carbon disc surrounded by two platinum rings, all mounted in high temperature, chemically resistant epoxy and housed in a titanium tube. The glassy carbon disc may serve as a counter electrode, and the platinum rings may individually serve as the working electrode and as the pseudo-reference electrode.

The ORP calibration may comprise measuring a kinetic parameter, such as current or charge transfer resistance, with the electrode system and measuring an oxidation/reduction potential of a calibration solution using a reference electrode that can measure a potential versus the SHE, such as a flow through reference electrode (FTRE) or an external pressure balanced reference electrode (EPBRE). In various embodiments, an overpotential ($\Delta E$) is imposed on the working electrode versus the pseudo-reference electrode through the use of potentiodynamic polarization. According to various embodiments, at a given $\Delta E$, for example, 100 mV, the steady state current density based on the solution concentration of iron, is recorded. At the same $\Delta E$, the ORP is measured versus a reference electrode that can measure potential versus the SHE and thus, the measured current at any given condition can be attributed to ORP of the solution. For example, at $\Delta E=100$ mV, the current density (referred to as the characteristic current density ($i_c$ or $i_{cc}$)) is measured and it is compared to the ORP measured using an FTRE. Thus, in a real autoclave for example, where no actual reference electrode is present, the $i_c$ measured by means of the electrode system disclosed herein may be compared to pre-existing calibration data using for example, a simple software routine. The ORP of the solution could then be determined at any given condition. Different conditions of ORP are generated by varying concentrations of iron, oxygen and other solution constituents in the calibration solution.

Figure 2:
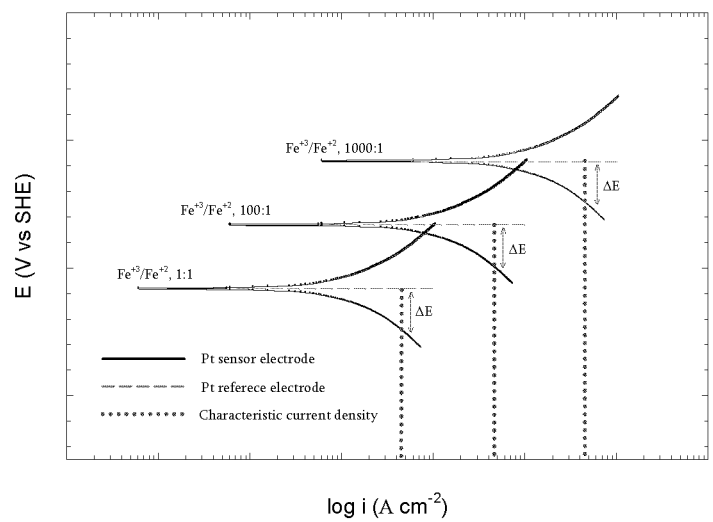
FIG. 2 shows theoretical variation of the current density and associated potential on a surface of a platinum electrode with varying $Fe^{3+}/Fe^{2+}$ ratios as measured with respect to the standard hydrogen electrode.

FIG. 2 shows the potential of calibration solutions with varying $Fe^{3+}/Fe^{2+}$ ratios measured using a reference electrode consisting of a Pt counter (or reference) electrode, a Pt working (or sensor) electrode and an EPBRE reference (or pseudo-reference) electrode that can be used to measure potential versus the SHE, as a function of current. The potential of the pseudo-reference electrode (dashed line in FIG. 2) measured versus the SHE is a function of the amount of oxidant in the solution, for example, the $Fe^3/Fe^{2+}$ ratio. Both the potential and exchange current on the working electrode and the pseudo-reference electrode will increase when the $Fe^3/Fe^{2+}$ ratio increases. As a result, at a constant overpotential ($\Delta E$ in FIG. 2), one can define a characteristic current density (vertical dotted line), which is representative of the corresponding ORP. The magnitudes in FIG. 2 are for demonstration purposes only.

Figure 3:
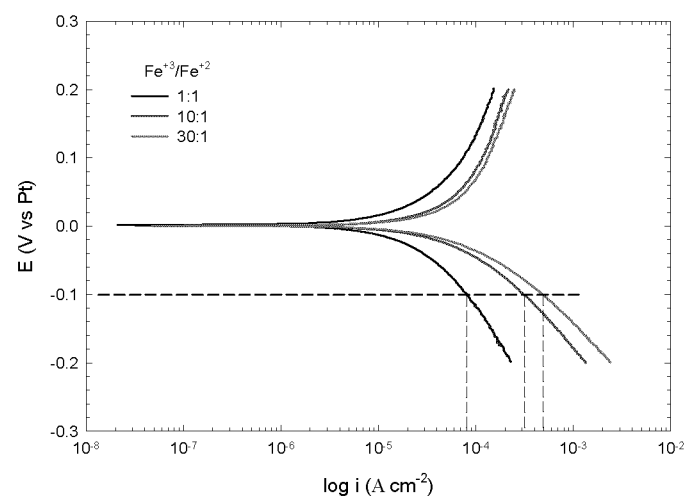
FIG. 3 shows polarization of an embodiment of the electrode system disclosed herein in the presence of various $Fe^{3+}/Fe^{2+}$ ratios showing the characteristic current density ($i_c$) that can then be used to obtain calibration data if oxidation/reduction potential (ORP) measurements of the calibration solutions are taken in parallel using a reference electrode.
Figure 4:
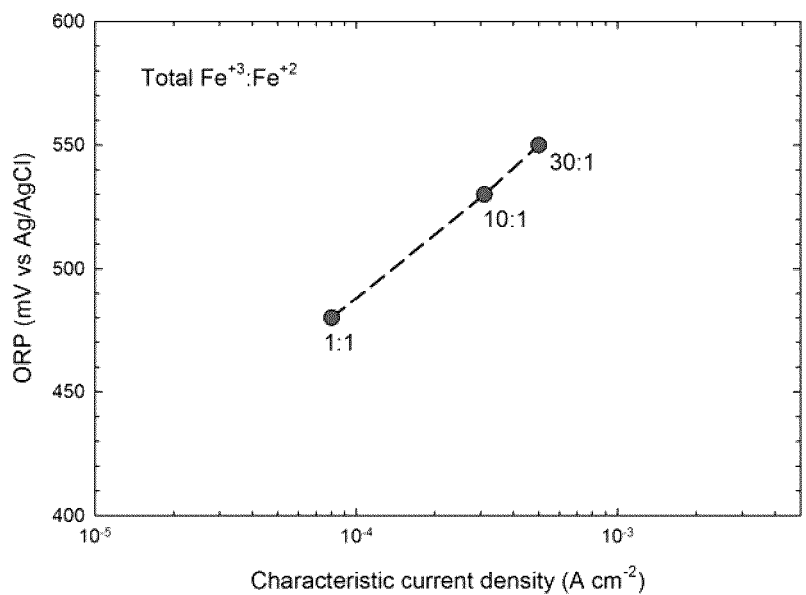
FIG. 4 shows a calibration plot obtained at 20° C. showing ORP in ordinate (as measured with a Ag/AgCl ORP electrode) as a function of $i_c$.

As a demonstration of the ORP calibration procedure, FIG. 3 presents the room temperature polarization plots obtained by embodiments of the apparatus, systems and methods disclosed herein in the presence of 1:1, 10:1 and 30:1 $Fe^{3+}/Fe^{2+}$ ratios (initial ferrous concentration was set at 1 $gL^{-1}$) in the calibration solutions. The reference electrode in FIG. 3 is a platinum pseudo-reference electrode and as potential is expressed with respect to the platinum working electrode, the ORP cannot be measured directly and the potential difference should be zero (as observed). However, the characteristic current density can be accurately measured, for instance, at an overpotential of −0.1 V. Combining the characteristic current densities obtained with the electrode system disclosed herein with ORP measurements obtained from the EPBRE reference electrode, one obtains the calibration data plotted in FIG. 4 which shows ORP as a function of characteristic current density. These plots may be generated as a function of varying industrial parameters, such as ferric, copper or zinc concentration, to provide a fully calibrated ORP apparatus. For a given characteristic current density measured using the electrode system, the ORP can be obtained from FIG. 4.

The apparatus, systems and methods disclosed herein rely on the operating redox couple to be a ferric/ferrous couple. In various embodiments, this may be true even in the presence of high oxygen concentrations. In some embodiments, the $i_c$ associated only with ferric reduction is measured. In other embodiments, a ratio of $i_c$ for both the anodic and cathodic reactions may be measured. These latter embodiments may reduce errors in measurement as this approach takes into account the ferrous concentration in the solution.

According to Equations (8) and (9), the ORP is related to the nominal [Fe$^{3+}$]/[Fe$^{2+}$] ratio, which directly reflects the extent of sulphide oxidation. Nominal [Fe$^{3+}$]/[Fe$^{2+}$] ratio refers to the calculated [Fe$^3$]/[Fe$^{2+}$] of a solution and is the concentration of total ferric in a solution divided by the concentration of total ferrous in the solution. Thus, embodiments of the disclosure may be used to continuously monitor the extent of sulphide oxidation in a solution or slurry, rather than having to wait 12 to 24 hours for assay results. In Equation (8), T is the temperature in Kelvin, R is the universal gas constant, n is the number of moles of electrons transferred in the cell reaction and F is the Faraday constant.

$$E(mV) = -1 \times 10^{-3} \times [T(K)]^2 + 0.91 \times T(K) + \frac{2.303R}{nF} \times T(K) \times 10^3 \times \frac{C_{ferric,nominal}}{C_{ferrous,nominal}} + 492 \quad (8)$$

Embodiments of the apparatus, systems and methods disclosed herein may be used to measure soluble iron concentrations in the solution. It has been demonstrated in previous high temperature work that there exists a relationship between the exchange current density ($i_o$) associated with ferric reduction, as indicated by Equation (9) (Yue, G. and Asselin E. (2014) *Electrochimica Acta* 146: 307-321). In Equation (9), $i_o$ can be obtained from a polarization plot using Tafel slopes, E is the ORP value, z is the number of moles of electrons transferred in the half-cell reaction, α is the chemical activity constant of ferric, and the rate constant of ferric reduction ($k_c$) can be calculated by Equation (10). The ferric concentration can also be validated by sampling solution during experiments. Therefore, the total iron concentration in situ can be obtained by Equations (9)-(12). Thus, embodiments of the disclosure may provide a new process control parameter for hydrometallurgical applications at high or low temperature.

$$i_o = zFk_c C_{ferric,real} \exp\left(-\frac{\alpha nFE}{RT}\right) \quad (9)$$

$$\ln k_c = -10245 \times \frac{1}{T(K)} + 31.349 \quad (10)$$

$$C_{ferric,real} = \frac{i_o}{zFk_c \exp\left(-\frac{\alpha nFE}{RT}\right)} \quad (11)$$

$$C_{iron,total} = C_{ferric} + C_{ferrous} = C_{ferric} \times \left(1 + \frac{C_{ferrous,real}}{C_{ferric,real}}\right) \quad (12)$$

The pH calibration may comprise measuring for a calibration solution, (a) pH using a pH meter, and (b) a kinetic parameter, such as current or charge transfer resistance, with the electrode system at a potential where current is proportional to hydrogen ion concentration in solution. At this potential, the ORP does not change with varying acid concentrations in solution and as a result, the system can be used to measure pH as the ORP values only depend on the ferric to ferrous ratio, and [Fe$^{3+}$]/[Fe$^{2+}$] is pH independent, described in Examples 7-9 below. Thus, in a real autoclave for example, where no actual pH meter is present, the $i_c$ measured by means of the electrode system disclosed herein may be compared to pre-existing pH calibration data using for example, a simple software routine. The pH of the solution could then be determined at any given condition. Different conditions of pH are generated by varying concentrations of acid, such as sulphuric acid, in the calibration solution or the temperature of the solution.

Various alternative embodiments and examples of the invention are described herein. These embodiments and examples are illustrative and should not be construed as limiting the scope of the invention.

EXAMPLES

Figure 5:
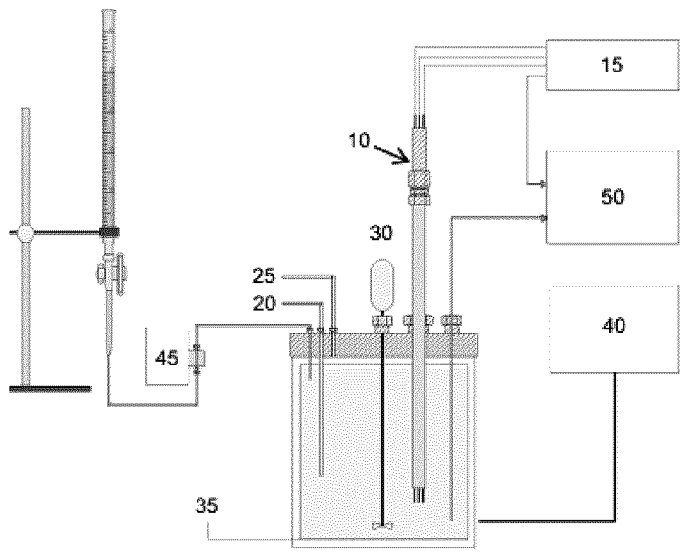
FIG. 5 shows a schematic of a setup used for obtaining calibration data.

Example 1: Investigation of Varying Ferrous, Oxygen, Chloride, Fluoride, Copper and Zinc Concentrations FIG. 5 shows a detailed schematic of the autoclave set-up used in these experiments. All experiments were carried out in a high temperature high-pressure autoclave (Inconel 625) with a glass liner (35) and equipped with a stirrer (30). The cell solution was heated and kept at a constant temperature with a controller (40). The electrode system (10) disclosed herein or the reference electrode (for example, a Wilhelm cell (50)) was placed in the cell and electrochemical measurements were obtained using a potentiostat (15). A gas inlet (20) and outlet (25) were used for applying an oxygen over-pressure. The reference solution comprised 42 gL$^{-1}$ H$_2$SO$_4$, 0.2 gL$^{-1}$ Fe$^{2+}$, and 0.2 gL$^{-1}$ Fe$^{3+}$. The operating temperature was 230° C., and the system was over pressurized with oxygen to 100 psig. Concentrated Fe$^{3+}$ solution was added to the autoclave (using a high precision positive displacement dual piston metering pump (Eldex ReciPro metering pump (45), model 1481, BB-4-VS)) to obtain various [Fe$^{3+}$]/[Fe$^{2+}$] ratios ranging from 1:1 to 100:1. The rest time for each step was approximately five minutes. An overpotential of 100 mV was applied to measure the kinetic parameter as current.

Figure 6:
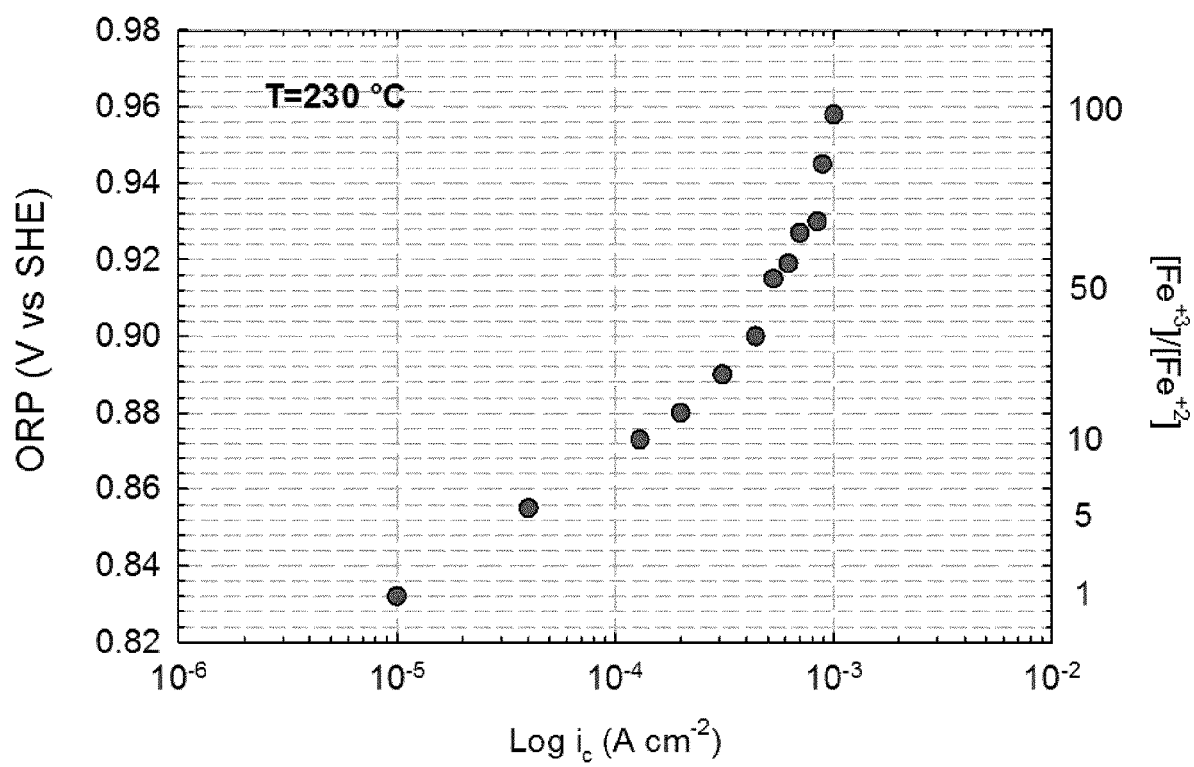
FIG. 6 shows the calibration plot of ORP values as a function of $i_c$ (as measured with a Ag/AgCl FTRE ORP electrode) and as a function of the $[Fe^{3+}]/[Fe^{2+}]$ ratios (1:1 to 100:1) at 230° C.; a given $i_c$ value corresponds to a specific ORP value for different $[Fe^{3+}]/[Fe^{2+}]$ ratios.

FIG. 6 shows ORP values measured using a FTRE reference electrode as a function of characteristic charge density ($i_t$) and as a function of calculated [Fe$^{3+}$]/[Fe$^{2+}$]. Test conditions were validated to compare calculated (Equation (8)) and measured ORP for the reference solution and the results are shown in FIG. 6.

The calibration plots were obtained for various conditions including the effect of initial ferrous, oxygen, chloride, fluoride, copper and zinc concentrations. The effect of these various conditions on the ORP measurements can be summarized as follows.

Figure 7:
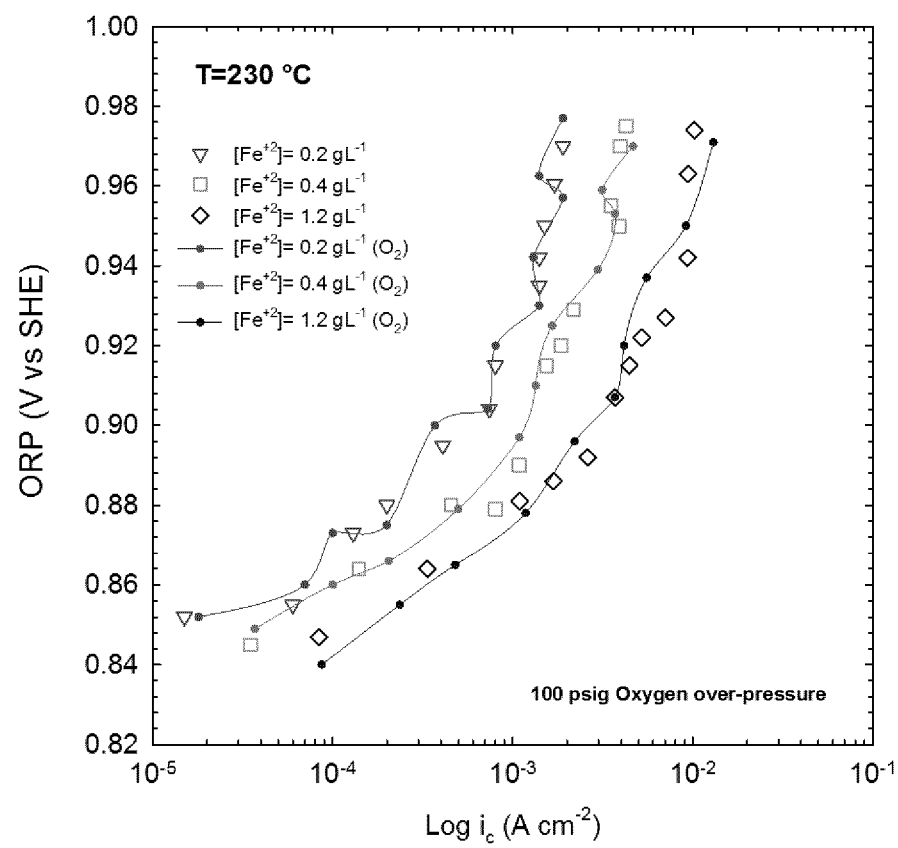
FIG. 7 shows calibration plots of ORP as a function of $i_c$ measured with an embodiment of the electrode system disclosed herein at 230° C. for various initial $Fe^{2+}$ concentrations in the presence and absence of a 100 psig oxygen over-pressure, wherein for each plot $[Fe^{3+}]/[Fe^{2+}]$ varies from 1:1 to 100:1.

The effect of initial concentration of ferrous in the reference solution and the error associated with the measurements is shown in FIG. 7. As shown in FIG. 7, for each characteristic current density, multiple ORP can be assigned if the total iron concentration in the solution or calibration solution varies.

It was found that oxygen does not affect the ORP as shown in FIG. 7. In these embodiments, ORP is determined by the [Fe$^{3+}$]/[Fe$^{2+}$] ratio because the ferric/ferrous couple is significantly more reversible than $O_2$ reduction on the surface of the working electrode.

Figure 8:
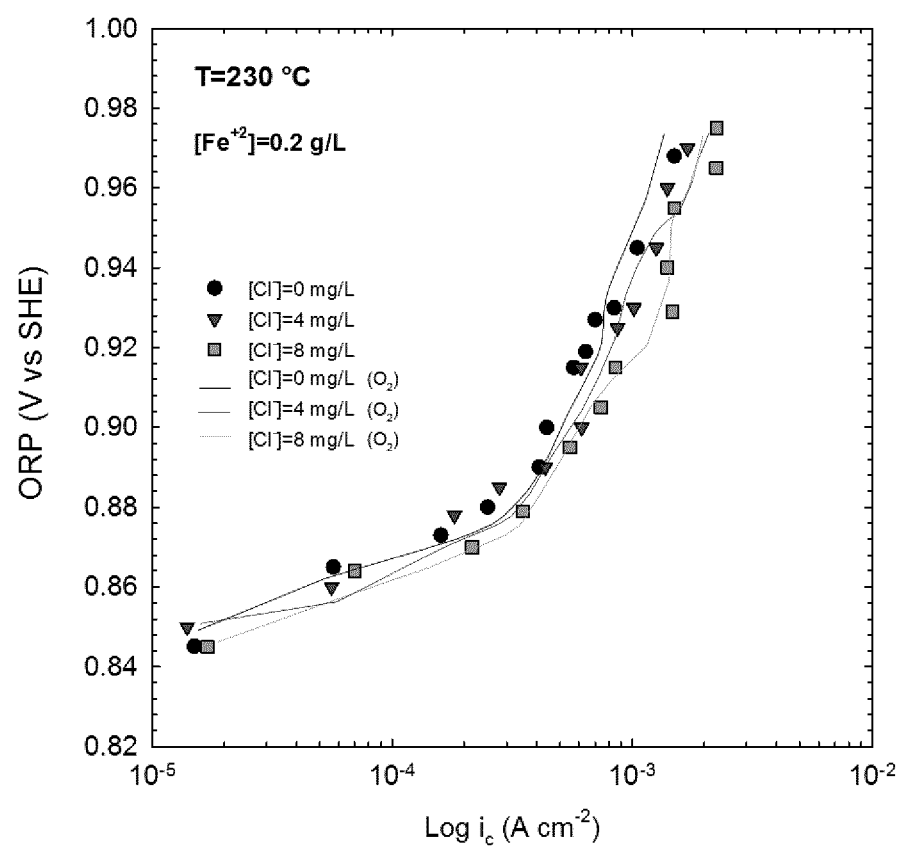
FIG. 8 shows calibration plots of ORP as a function of $i_c$ measured with an embodiment of the electrode system disclosed herein at 230° C. for various initial chloride concentrations in the presence and absence of a 100 psig oxygen over-pressure, wherein for each plot $[Fe^3]/[Fe^{2+}]$ varies from 1:1 to 100:1.
Figure 9:
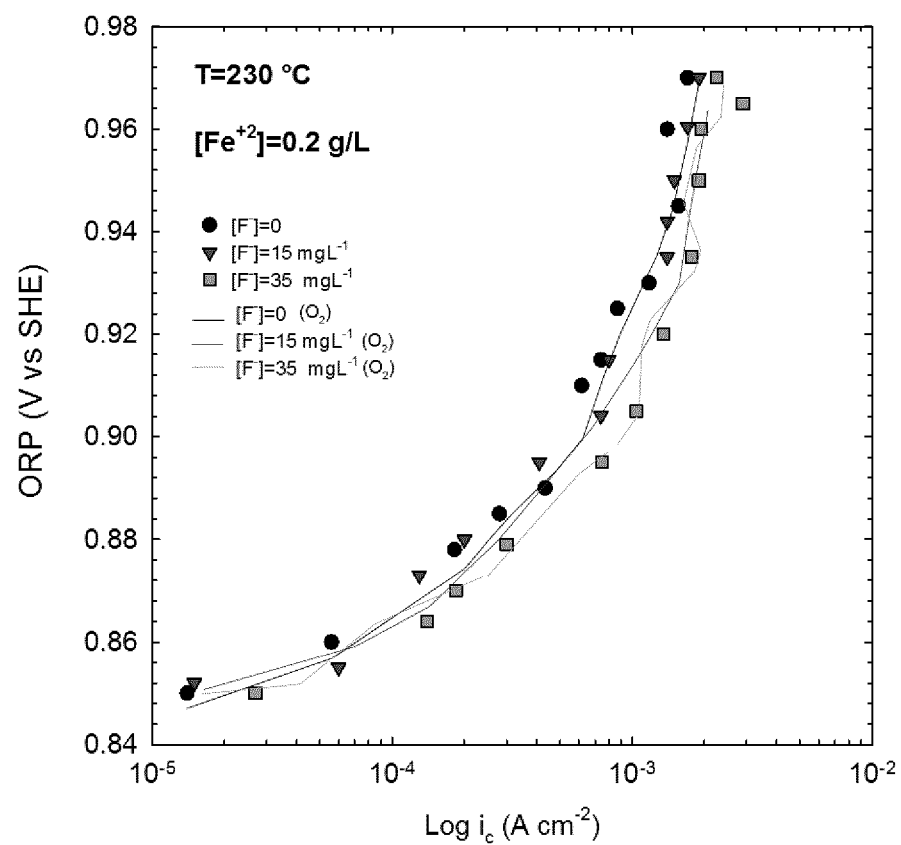
FIG. 9 shows calibration plots of ORP as a function of $i_c$ measured with an embodiment of the electrode system disclosed herein at 230° C. for various initial fluoride concentrations in the presence and absence of a 100 psig oxygen over-pressure, wherein for each plot $[Fe^3]/[Fe^{2+}]$ varies from 1:1 to 100:1.

Likewise, the addition of chloride or fluoride either did not affect or only negligibly affected the ORP measurements as shown in FIGS. 8 and 9, respectively, and presence of oxygen did not appear to affect the measurement.

Figure 10:
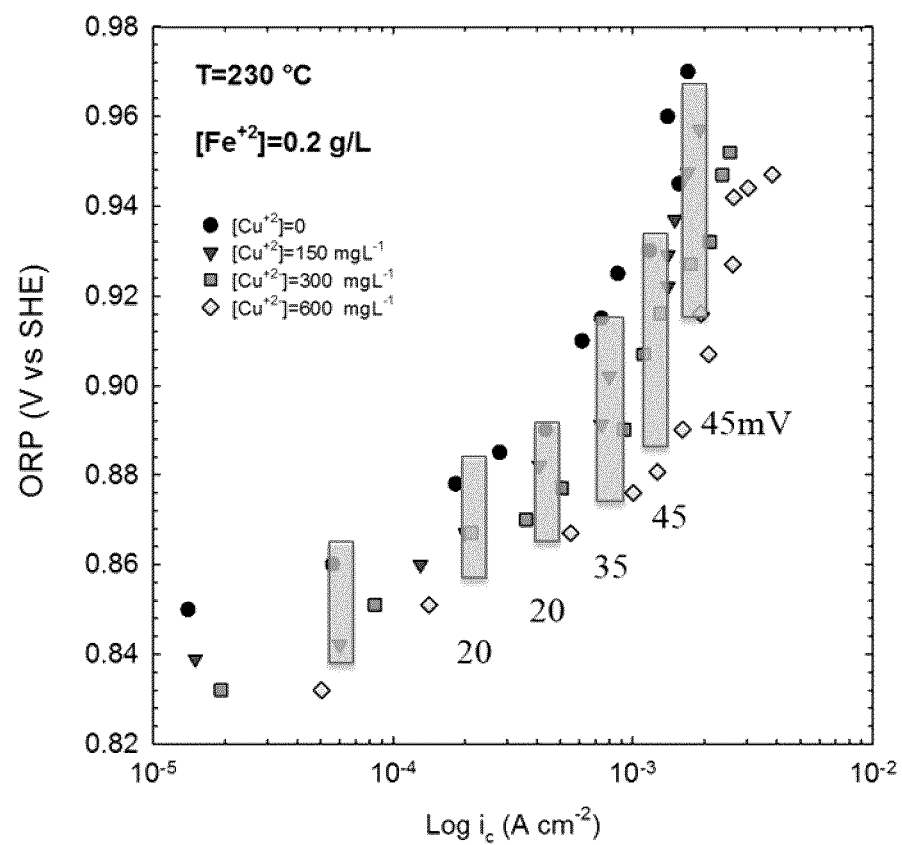
FIG. 10 shows the error associated with calibration plots of ORP as a function of $i_c$ measured with an embodiment of the electrode system disclosed herein at 230° C. and an initial $[Fe^{2+}]$ of 0.2 $gL^{-1}$ for various copper concentrations, wherein for each plot $[Fe^{3+}]/[Fe^{2+}]$ varies from 1:1 to 100:1.
Figure 11:
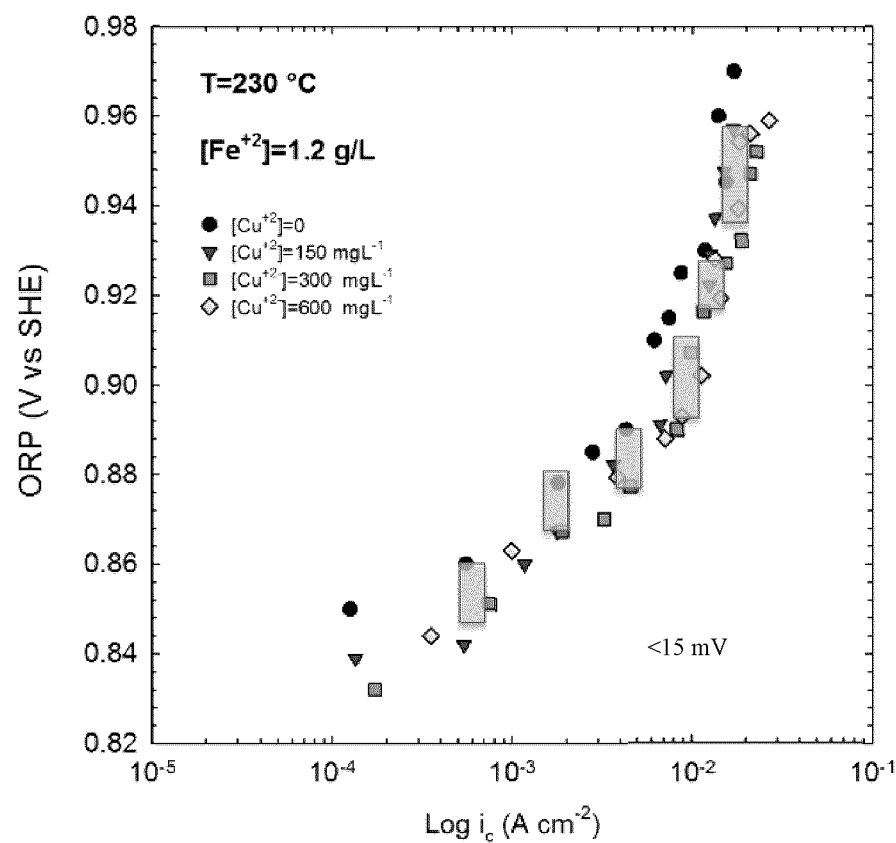
FIG. 11 shows the error associated with calibration plots of ORP as a function of $i_c$ measured with an embodiment of the electrode system disclosed herein at 230° C. and an initial $[Fe^{2+}]$ of 1.2 $gL^{-1}$ for various copper concentrations, wherein for each plot $[Fe^{3+}]/[Fe^{2+}]$ varies from 1:1 to 100:1.
Figure 12:
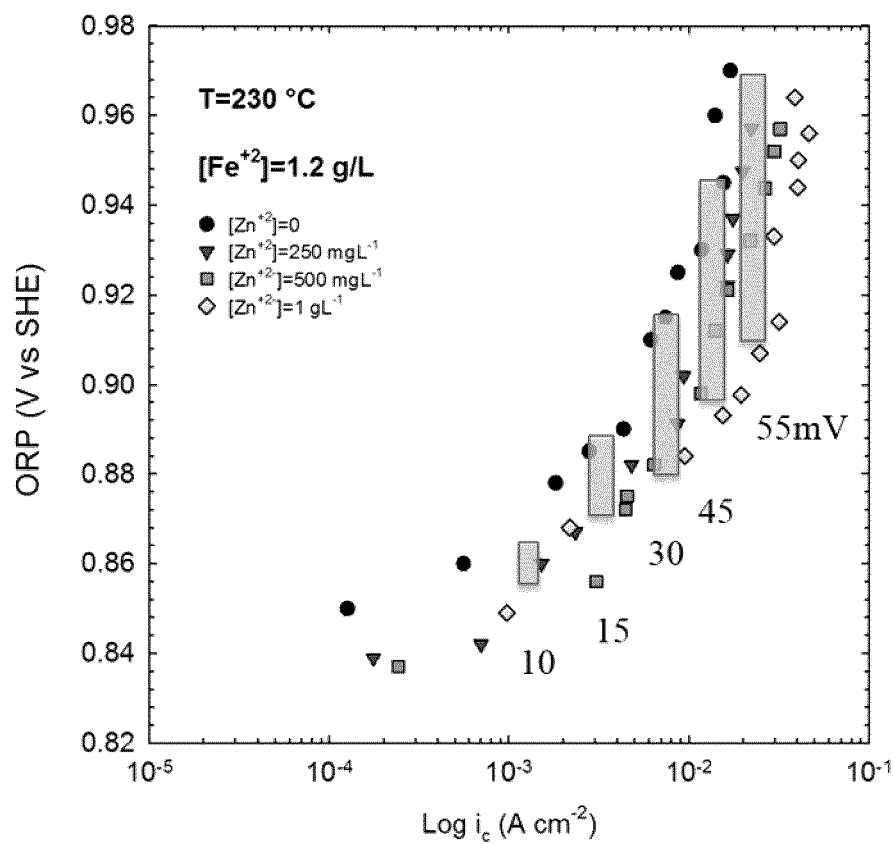
FIG. 12 shows the error associated with calibration plots of ORP as a function of $i_c$ measured with an embodiment of the electrode system disclosed herein at 230° C. and an initial $[Fe^{2+}]$ of 1.2 $gL^{-1}$ for various zinc concentrations, wherein for each plot $[Fe^{3+}]/[Fe^{2+}]$ varies from 1:1 to 100:1.

The ORP was affected by copper and zinc concentrations. Conditions were tested in which the reference solution comprised approximately 600 mgL$^{-1}$ copper and approximately 2 gL$^{-1}$ zinc. However, it is seen that as the initial Fe' concentration increases, the dependency of the ORP on the copper concentration decreases. For example, at an initial ferrous concentration of 0.2 gL$^{-1}$, a change in copper concentration can result in an error of 45 mV as shown in FIG. 10. On the other hand, this error is reduced to less than 15 mV when the initial $Fe^{2+}$ concentration increases to 1.2 gL$^{-1}$ as shown in FIG. 11. Data for varying zinc concentrations is shown in FIG. 12.

Example 2: Investigation of Solids Concentrations

Figure 13:
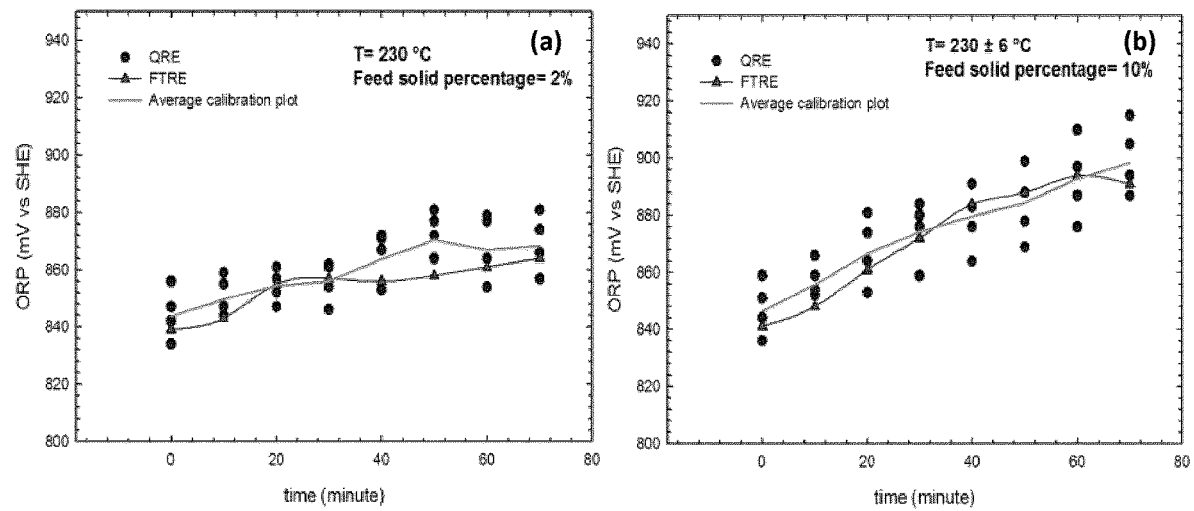
FIG. 13 shows measured ORP using FTRE and the electrode system for slurry samples comprising (a) 2 wt % ore samples and (b) 10 wt % ore samples at 230° C.

Solids loadings of 2 wt %, 10 wt %, 20 wt % and 30 wt % were used to reflect a POX environment. Experimental conditions consisted of a reference solution comprising 42 gL$^{-1}$ $H_2SO_4$, 0.2 gL$^{-1}$ $Fe^{2+}$, 0.2 gL$^{-1}$ $Fe^{3+}$, initial temperature of 230° C. and oxygen over-pressure of 100 psig. In all experiments the suspension was stirred at 500 rpm. After reaching the set temperature, ORP was measured over time using both a FTRE and the electrode system as disclosed herein. FIG. 13 shows the obtained values of ORP for 2 wt % (FIG. 13(a)) and 10 wt % solids (FIG. 13(b)). There are four data points for every time step measured with the electrode system. Although various ORP data may be obtained using the different calibration plots, the error in the measurement procedure is less than 25 mV. As a result, at any time step, the average values were calculated and plotted (grey line). It can be observed that the average ORP calibration plot (grey line) is very consistent with the actual ORP measurements (black line) obtained by FTRE. In view of the foregoing, embodiments of the disclosure may yield accurate ORP values to within 15 mV in a POX environment.

Figure 14:
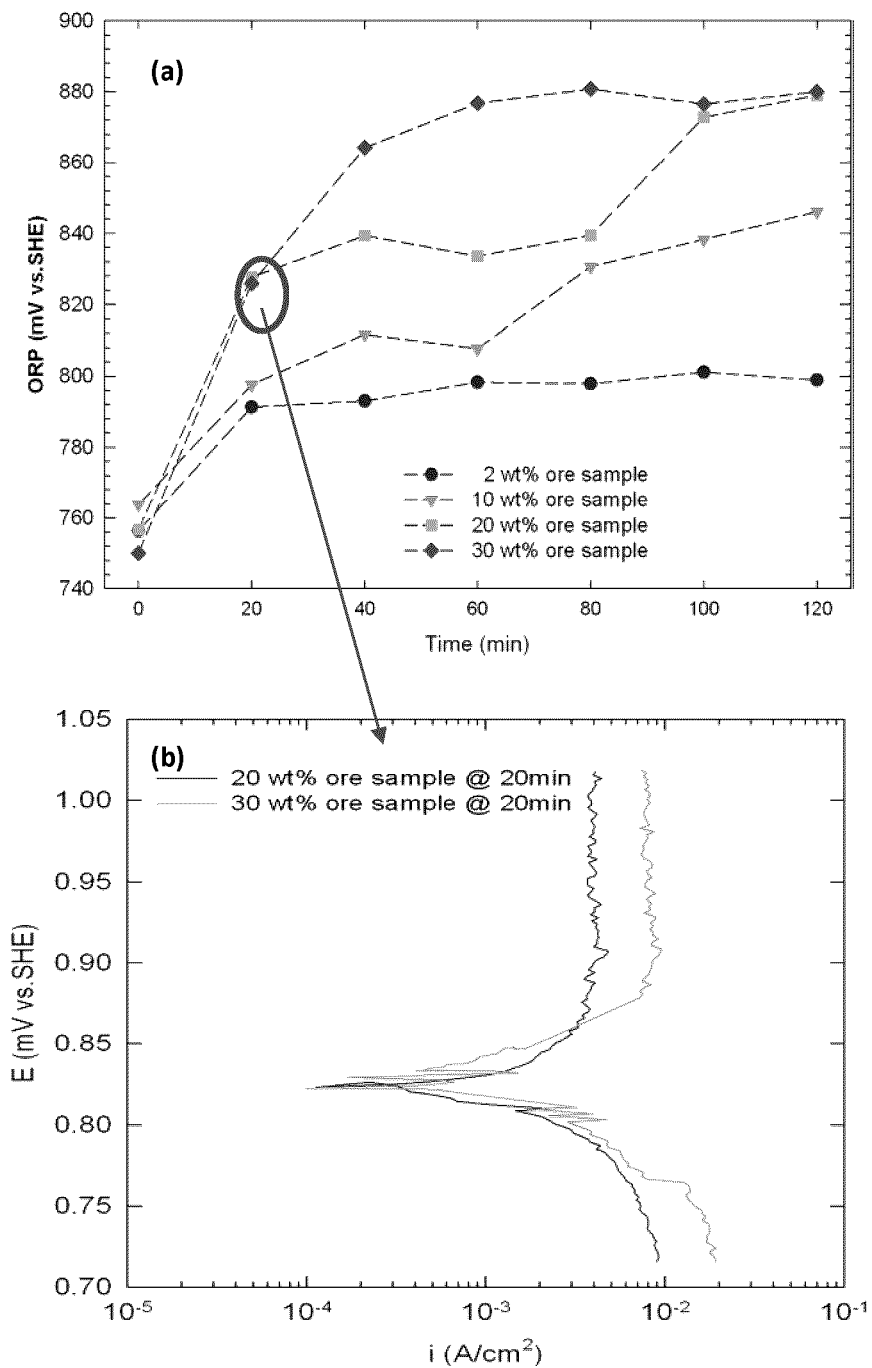
FIG. 14 shows (a) plots of ORP as a function of time wherein ORP was measured using an embodiment of the electrode system disclosed herein at 230° C. for various wt % solids in the calibration solution, and (b) the same ORP value may be attributed to two different polarization plots.
Figure 15:
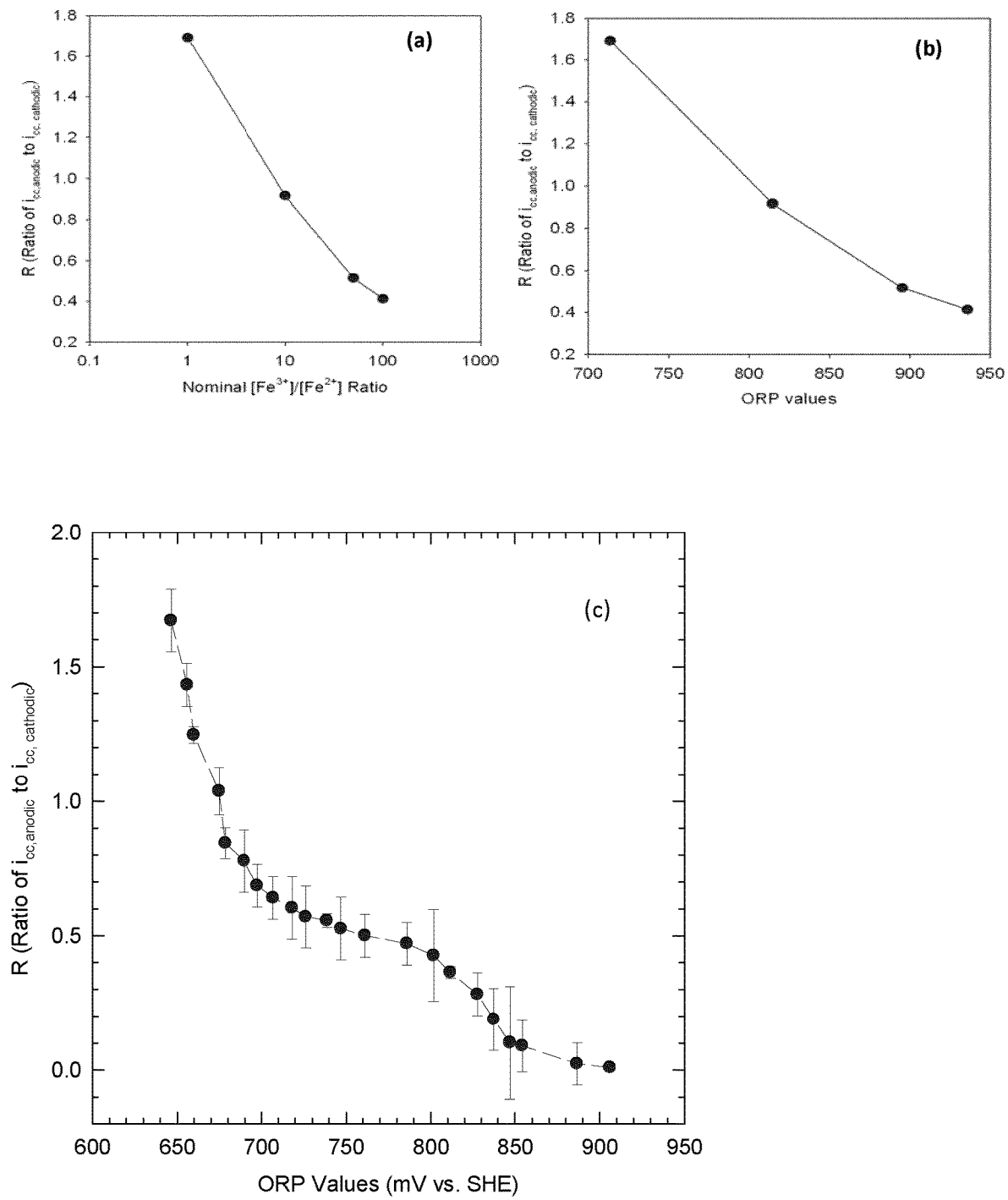
FIGS. 15(a)-(c) show calibration plots of ORP as a function of the ratio R of $i_{cc,\ anodic}$ to $i_{cc,\ cathodic}$ measured with an embodiment of the electrode system disclosed herein at 230° C. for various initial $[Fe^{3+}]/[Fe^{2+}]$ ratios.

Example 3: Measuring the Ratio of $i_{cc}$ for Both the Anodic and Cathodic Reactions The apparatus, systems and methods disclosed herein rely on the operating redox couple to be the ferric/ferrous couple in order to measure ORP. This is true even in the presence of high oxygen concentrations, as discussed above. In various embodiments of the disclosure, the $i_c$ associated only with ferric reduction is measured. These embodiments may result in error because the ferrous concentration in the system is not accounted for and the ORP value may have multiple corresponding characteristic current densities. For example, FIG. 14(a) shows calibration plots of ORP versus time wherein ORP was measured using the electrode system at 230° C. for various wt % solids in the reference solution. FIG. 14(b) shows the same ORP value is attributed to two different polarization plots, i.e., the relation between ORP and $i_c$ is not exclusive. To reduce this error, the ratio of $i_c$ for both the anodic ($i_{cc,\ anodic}$) and cathodic ($i_{cc,\ cathodic}$) reactions can be measured. In this method, at any given condition, potentiodynamic polarization plots (PDP) such as those in FIG. 14(b) were generated. At $\Delta E=+100$ mV and $\Delta E=-100$ mV, the current values (here they are referred to as the characteristic currents, $i_{cc,\ +100\ mV}$ and $i_{cc,\ -100\ mV}$) were recorded. The factor R is defined as the ratio of $i_{cc,\ +100\ mV}$ and $i_{cc,\ -100\ mV}$. As shown in FIG. 15, the factor R is directly related to the nominal ratio of $[Fe^{3+}]/[Fe^{2+}]$ (FIG. 15(a)), and the ORP value (FIG. 15(b)). Thus, one value of R can be translated to one ORP value. Various conditions of ORP were generated by varying the concentrations of iron, changing the ferric/ferrous couple, and changing the operating temperature in order to establish the R vs. ORP relationship shown in FIG. 15(c).

Example 4: Using the ORP Sensor for the POX Process

Figure 16:
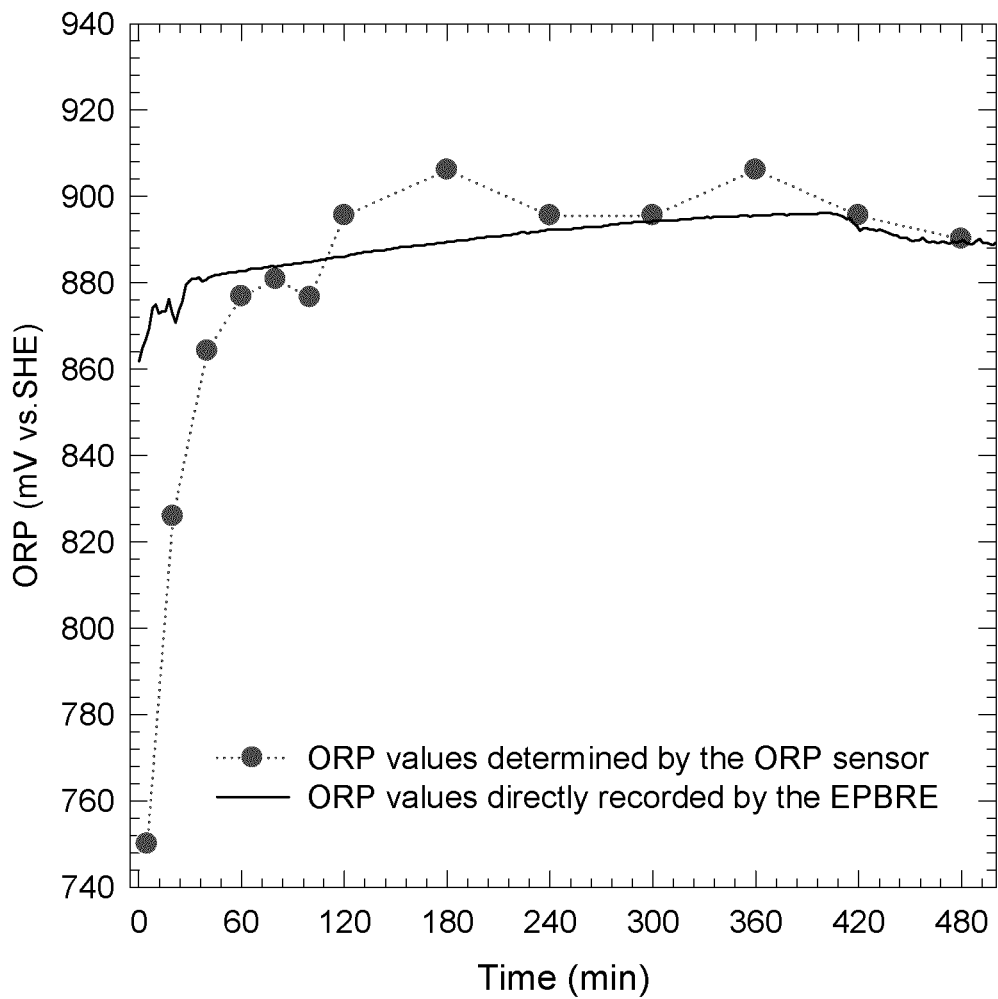
FIG. 16 shows the ORP values as a function of time for slurries containing 30 wt % sulphide ore sample in the background solution of 0.42 M $H_2SO_4$+3.6 mM $Fe^{2+}$+3.6 mM $Fe^{3+}$ at 230° C., and 100 psi $O_2$ overpressure.

The ORP sensor as designed in this work was used while oxidizing a gold-bearing sulphide ore. A potentiostat periodically measured a PDP on the Pt working electrode as described above, the PDP plots were saved, and the characteristic currents were used for the calculation of R. The R ratios were translated into ORP values using the calibration plot in FIG. 15(c) through a simple software routine. The ORP values were recorded as a function of time and are shown as the dots seen in FIG. 16. It can be observed that the ORP values by the developed sensor are consistent with the ORP measurements (black line) obtained with a laboratory EPBRE.

Example 5: Correlation Between In Situ ORP and Sulfide Oxidation

Figure 17:
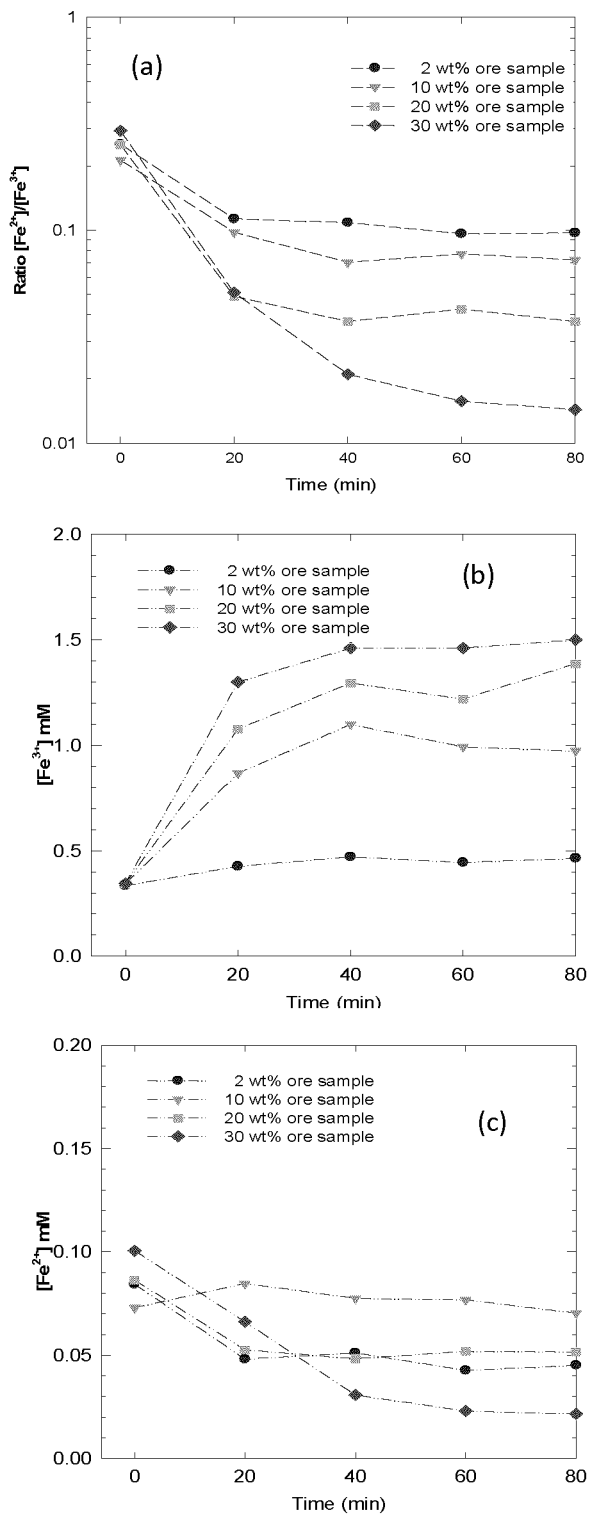
FIG. 17 shows (a) the $[Fe^{3+}]/[Fe^{2+}]$ ratios, (b) the $[Fe^{3+}]$ concentrations, and (c) the $[Fe^{2+}]$ concentrations estimated by the electrode system disclosed herein.

The ORP value is related to the $[Fe^{2+}]/[Fe^{3+}]$ ratio, which directly reflects the extent of sulphide oxidation. Thus, in order to evaluate the extent of sulphide oxidation occurring in parallel with the ORP measurements, in situ ORPs (in FIG. 14(a)) were converted to in situ nominal ratios of $[Fe^{2+}]/[Fe^{3+}]$ by Equation (8). The in situ $[Fe^{2+}]/[Fe^{3+}]$ ratio, and $[Fe^{2+}]$ and $[Fe^{3+}]$ concentrations as a function of time for slurries containing various wt % solids is shown in FIG. 17. The experimental conditions of FIG. 17(a-c) are in the background solution of 0.42 M $H_2SO_4+3.6$ mM $Fe^{3+}+3.6$ mM $Fe^{2+}$ with ore samples at 230° C., 100 psi $O_2$ overpressure; $O_2$ was introduced to the system when temperature reached 100° C. Results in FIG. 17 are based on in situ measurements with an embodiment of the current disclosure instead of sampling analysis during POX leaching of the refractory gold ore.

Example 6: Measuring Total Iron Concentration In Situ

Figure 18:
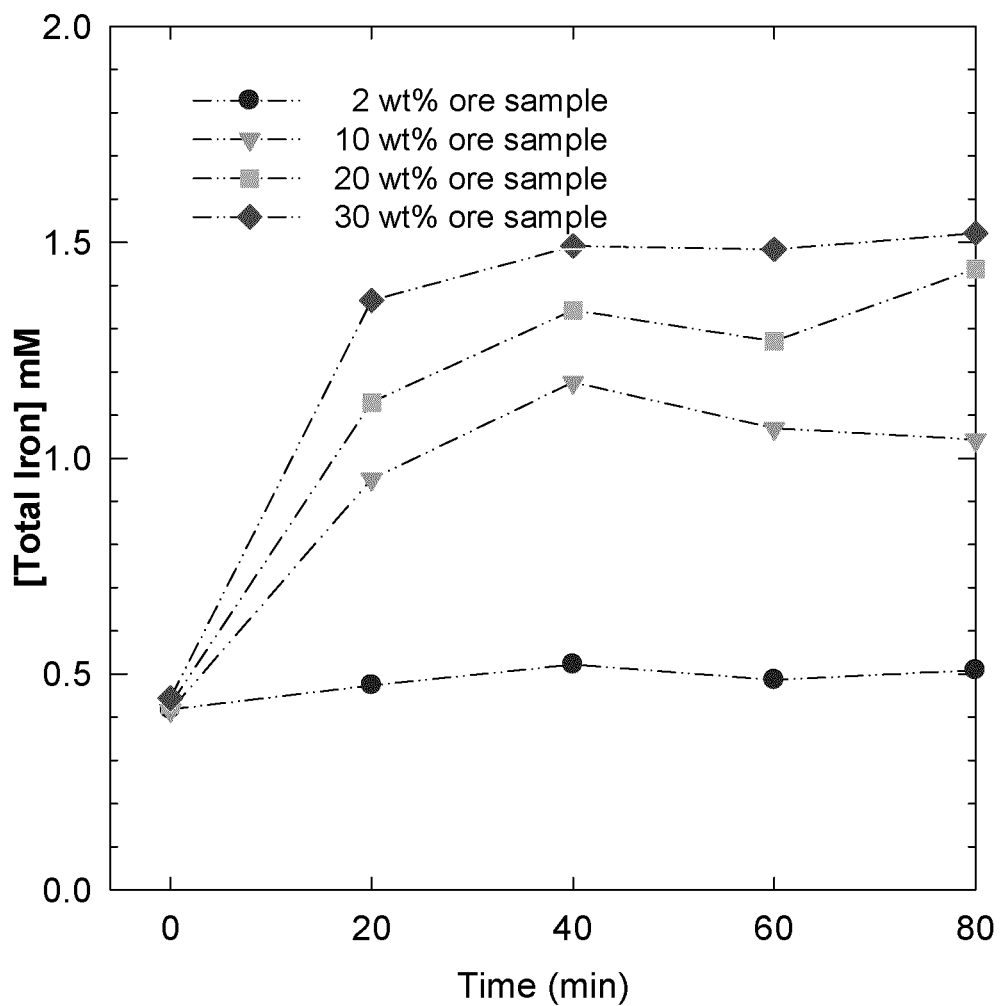
FIG. 18 shows the total dissolved iron ions measured by in situ $Fe^{3+}$ ions, the $[Fe^{3+}]/[Fe^{2+}]$ ratios and Equation (13)

Total iron concentration in situ can be measured by combining results from FIGS. 17(b) and (c), as shown in FIG. 18. Thus, embodiments of methods and systems disclosed herein can be used to calculate the concentration of ferric ions and total dissolved iron in situ, as indicated by Equations (11) and (12).

Example 7: Characteristic Current as a Function of Sulphuric Acid Concentration

Figure 19:
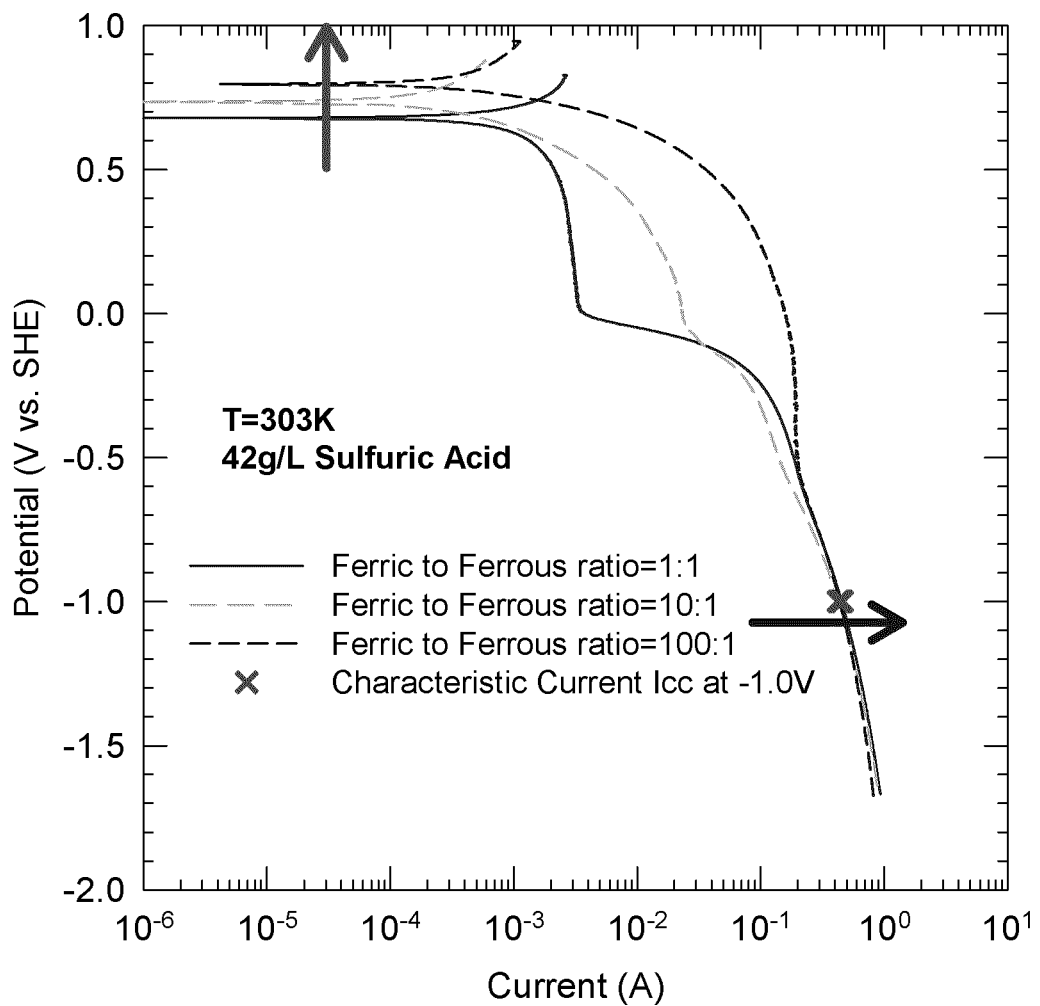
FIG. 19 shows the current density and associated potential on a surface of a platinum electrode with varying $[Fe^{3+}]/[Fe^{2+}]$ ratios at the same acid concentration as measured with respect to the standard hydrogen electrode.

As shown in FIG. 19, for solutions comprising the same sulphuric acid concentration, the characteristic currents ($i_c$) at −1.0 V did not change with increasing ferric to ferrous ratios (horizontal arrow) while the ORP values increased with increasing ferric to ferrous ratios (vertical arrow). The reference solutions consisted of 42 g/L sulphuric acid, 0.2 g/L $Fe^{2+}$ (from $FeSO_4$) and 0.2 g/L $Fe^{3+}$ (from $Fe_2(SO_4)_3$) with a ferric to ferrous ratio of 1:1 at a temperature of 303

Figure 20:
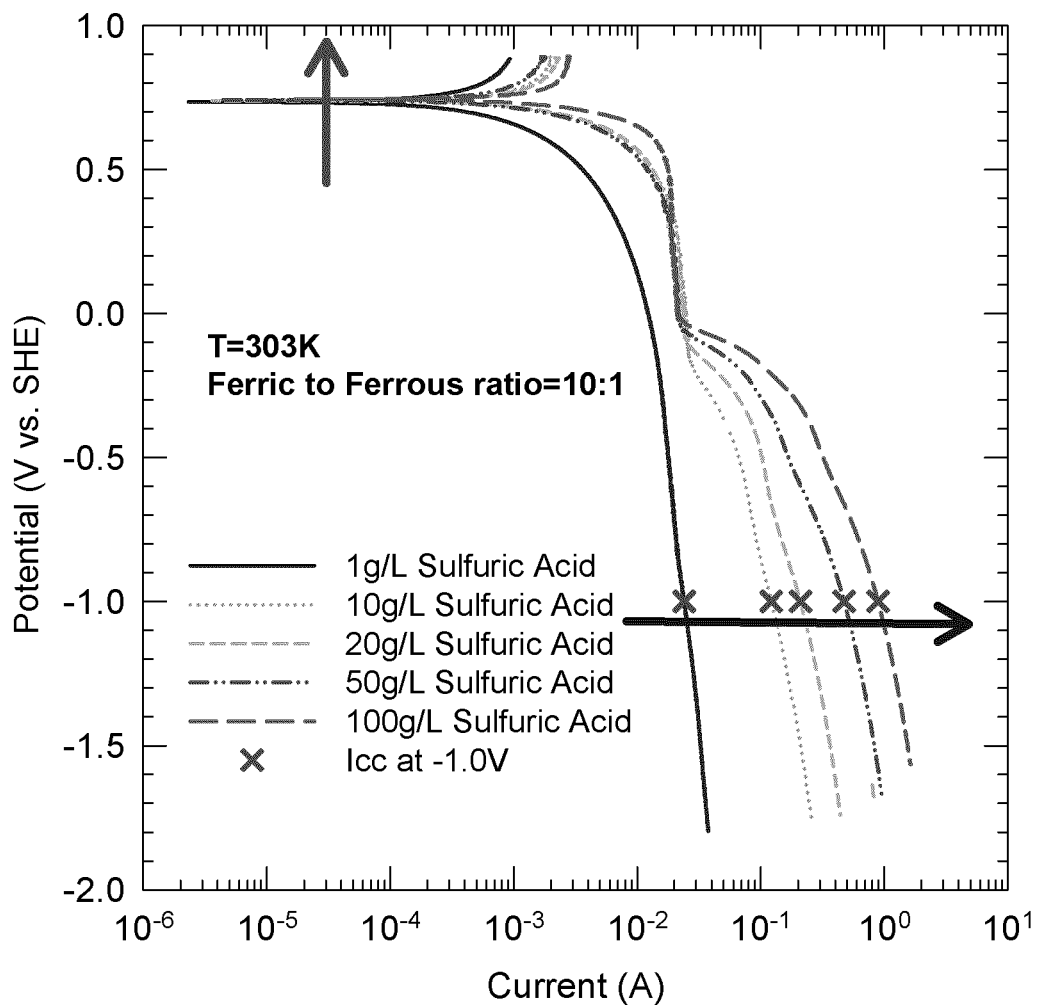
FIG. 20 shows the current density and associated potential on a surface of a platinum electrode at the same $[Fe^{3+}]/[Fe^{2+}]$ ratio with varying concentrations of sulphuric acid as measured with respect to the standard hydrogen electrode.

K. Various amounts of $Fe^{3+}$ (from $Fe_2(SO_4)_3$) were used to obtain various $[Fe^{3+}]/[Fe^{2+}]$ ratios ranging from 1:1 to 100:1. The polarization scan rate was 1.0 $mVs^{-1}$. However, as shown in FIG. 20, when the potential was driven down to −1.0 V, characteristic current became dependent on hydrogen ion concentration in solution, with the current increasing with sulphuric acid concentration (horizontal arrow in FIG. 20). The ORP values did not change with increasing acid concentration (vertical arrow in FIG. 20). In these experiments, the ferric to ferrous ratio was held constant at 10:1 and different concentrations of sulphuric acid were used. This data demonstrate that characteristic current can be used to measure pH in a high temperature, high pressure environment such as a POX reactor.

Example 8: Effect of Temperature on pH Measurement

Figure 21:
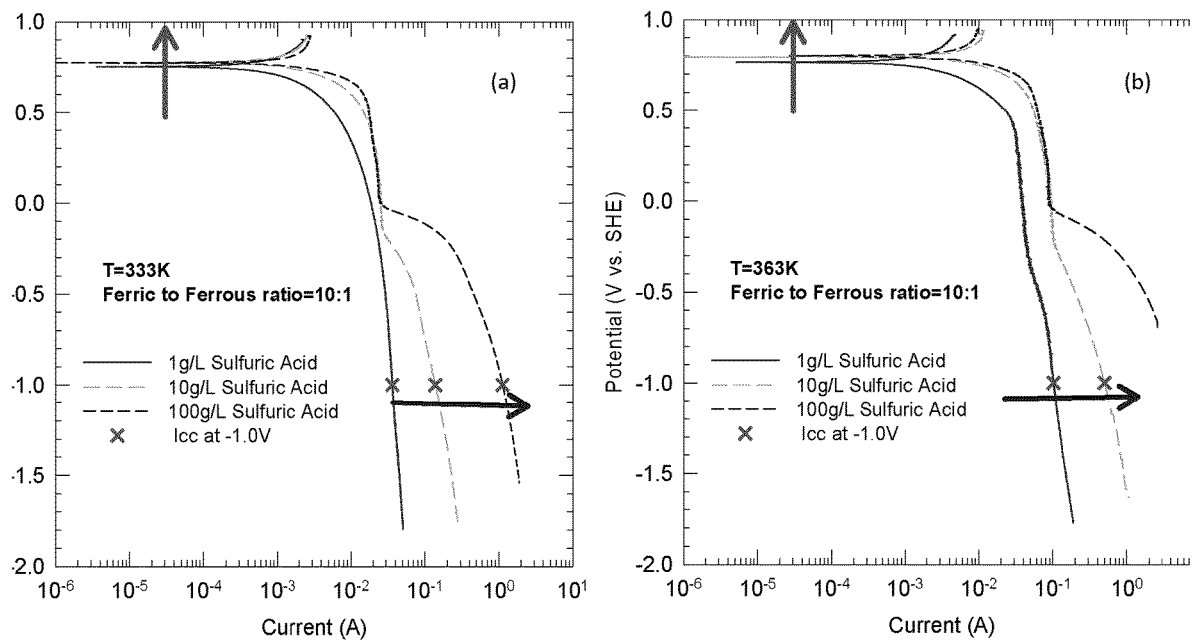
FIG. 21 shows current density and associated potential on a surface of a platinum electrode at the same $[Fe^{3+}]/[Fe^{2+}]$ ratio with varying concentrations of sulphuric acid as measured at (a) 333 K and (b) 363 K with respect to the standard hydrogen electrode.
Figure 22:
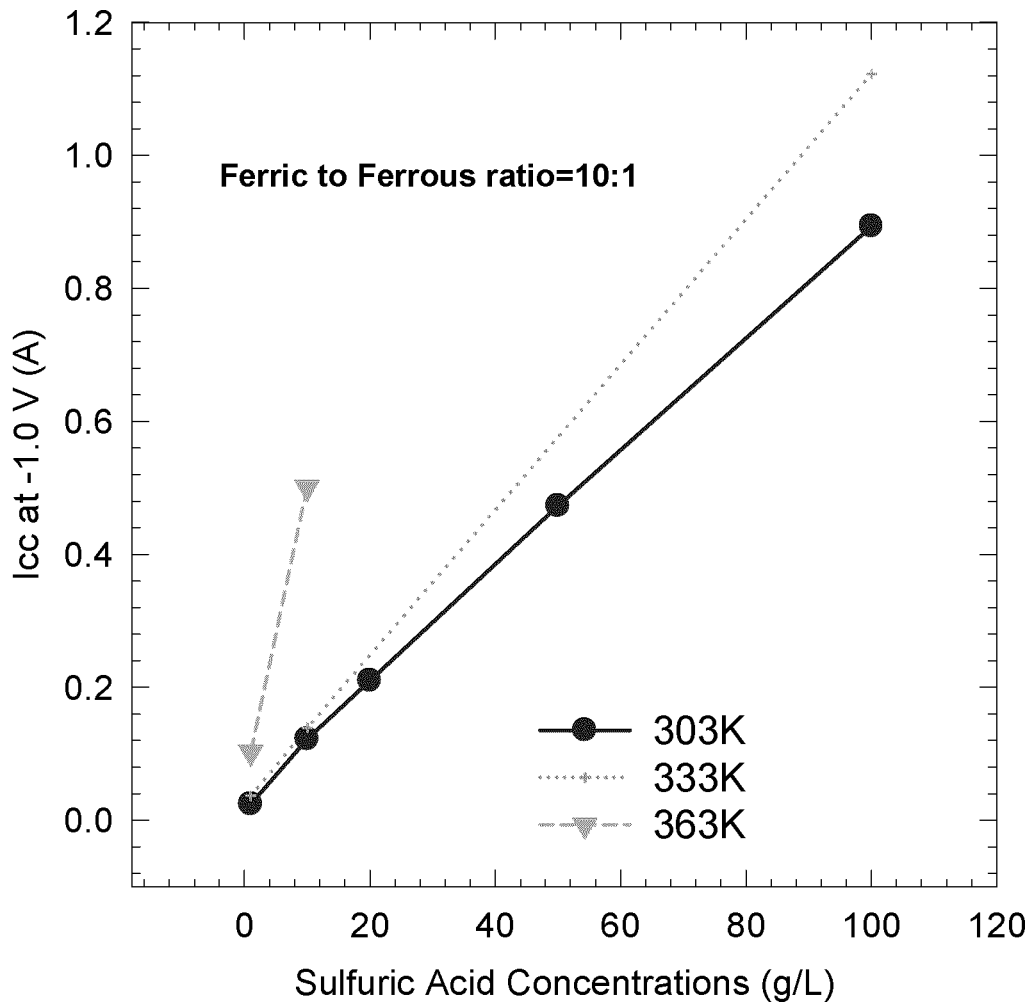
FIG. 22 shows measured $i_{cc}$ at −1 V as a function of sulphuric acid concentration at a constant $[Fe^{3+}]/[Fe^{2+}]$.

The experiments were conducted outside of a pressure vessel using solutions which were heated and kept at a constant temperature of 333 K or 363 K. The reference solutions comprised a ferric to ferrous ratio of 10:1 and varying sulphuric acid concentrations of 1 g/L, 10 g/L or 100 g/L. Varying potentials were applied at a polarization scan rate of 1.0 $mVs^{-1}$ and characteristic current was measured. As shown in FIGS. 21(a) and (b), current increased with increasing temperature for the same concentration of sulphuric acid in the reference solution. With respect to the 100 g/L sulphuric acid solution at 363 K, the current was so high that the equipment could not measure it. FIG. 22 shows that the characteristic current density at −1.0 V as a function of sulphuric acid concentration has a linear relationship.

Example 9: Calibration of Characteristic Current Density to pH

Figure 23:
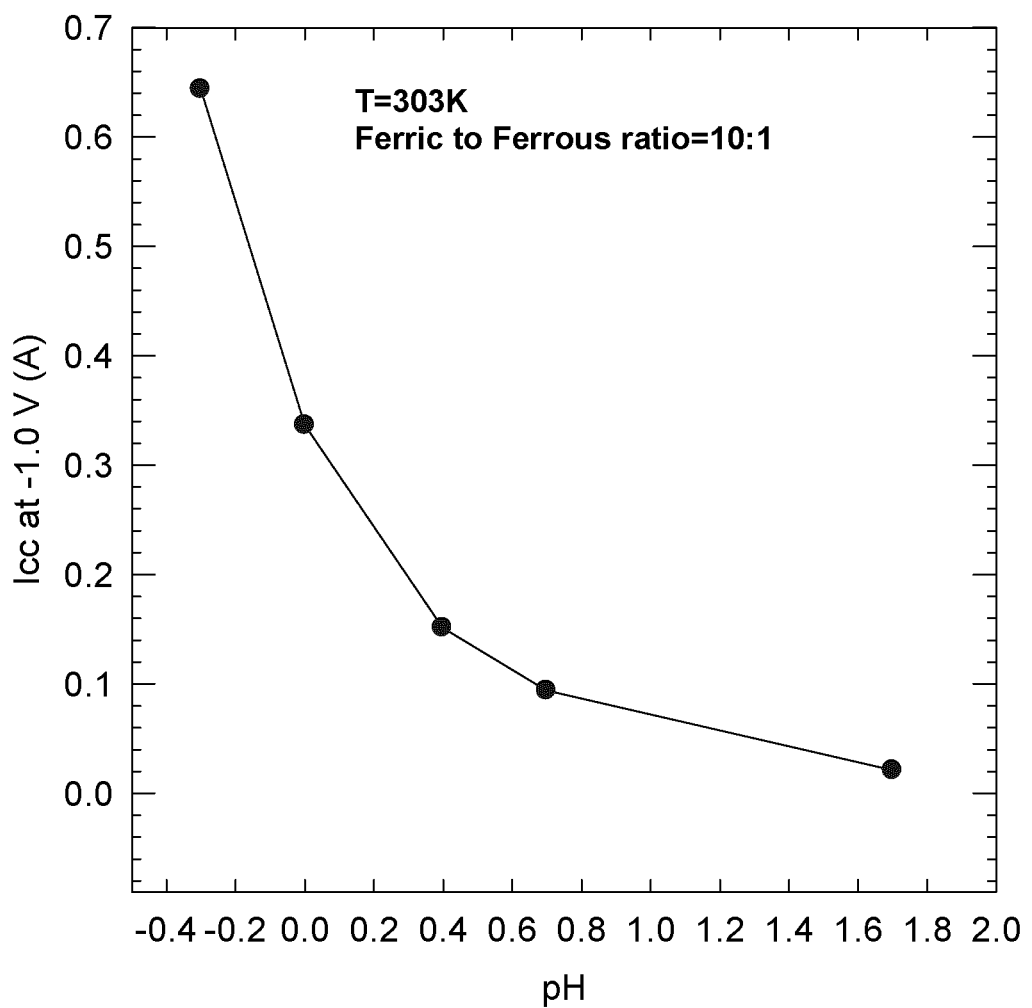
FIG. 23 shows measured $i_{cc}$ at −1 V from FIG. 21(a) as a function of pH.

The pH of the solutions from Example 7 was measured using a commercial pH metre and plotted against the characteristic current data from FIG. 21(a). The results are shown in FIG. 23. It was found that a 1:1 relationship exists between pH and $i_{cc}$ values. Thus, pH of a solution can be measured by comparing the measured kinetic parameter of a solution to pH calibration data.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. The word "comprising" is used herein as any open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing.

Citation of references herein is not an admission that such references are prior art to the present invention nor does it constitute any admission as to the contents or date of these documents.

What is claimed is:

1. A method for in situ measurement of an oxidation/reduction potential (ORP) of a solution comprising iron, the method comprising:

measuring a kinetic parameter at an electrode surface of an electrode system comprising a working electrode, a counter electrode and a pseudo-reference electrode, wherein the kinetic parameter is associated with ferric reduction or both ferric reduction and ferrous oxidation; and comparing the kinetic parameter to ORP calibration data for the electrode system to determine the ORP of the solution, wherein the ORP calibration data is obtained by measuring at least two calibration solutions, each of the at least two calibration solutions comprising ferric and ferrous ions with different ratios of ferric to ferrous ions, wherein for each of the at least two calibration solutions is measured: (a) an ORP of each calibration solution with a reference electrode, and (b) the kinetic parameter at the electrode surface of the electrode system, and wherein the ORP of the solution corresponds to an ORP value derived from the ORP calibration data for the same kinetic parameter.

2. The method of claim 1, wherein the kinetic parameter is current.

3. The method of claim 2, wherein measuring the current comprises imposing a constant cathodic overpotential on the working electrode.

4. The method of claim 2, wherein measuring the current comprises: (a) imposing an anodic overpotential followed by a cathodic overpotential on the working electrode and measuring a ratio of an anodic current to a cathodic current; or (b) imposing a cathodic overpotential followed by an anodic overpotential on the working electrode and measuring a ratio of a cathodic current to an anodic current.

5. The method of claim 1, wherein the kinetic parameter is charge transfer resistance.

6. The method of claim 1, wherein the reference electrode for measuring the ORP of each calibration solution is an external pressure balanced reference electrode (EPBRE) or a flow through reference electrode (FTRE).

7. The method of claim 1, wherein the working electrode, the counter electrode and the pseudo-reference electrode each independently comprise a platinum, a gold, a carbon, a palladium or an iridium sensor.

8. The method of claim 1, wherein the working electrode, the counter electrode and the pseudo-reference electrode each comprise a platinum wire sensor.

9. The method of claim 1, further comprising calculating a total soluble iron concentration in the solution using the ORP of the solution.

10. The method of claim 1, further comprising calculating an extent of sulphide oxidation in the solution using the ORP of the solution.

11. The method of claim 1, wherein the solution is a slurry comprising iron.

12. The method of claim 1, wherein the solution is a slurry from a pressure oxidation process.

13. The method of claim 1, wherein the solution is at a temperature between about 25° C. and about 230° C.

14. A method for in situ measurement of a pH of a solution comprising iron, the method comprising:

measuring a kinetic parameter at an electrode surface of an electrode system comprising a working electrode, a counter electrode and a pseudo-reference electrode, wherein the kinetic parameter is associated with ferric reduction or both ferric reduction and ferrous oxidation; and comparing the kinetic parameter to pH calibration data for the electrode system to determine the pH of the solution, wherein the pH calibration data is obtained by measuring at least two calibration solutions, wherein each of the at least two calibration solutions comprises ferric and ferrous ions and sulphuric acid with the same ratio of ferric to ferrous ions and different sulphuric acid concentrations, wherein for each calibration solution is measured: (a) pH, and (b) the kinetic parameter at the electrode surface of the electrode system at a potential where the kinetic parameter is dependent on a concentration of hydrogen ions in each calibration solution, wherein the pH of the solution corresponds to a pH value derived from the pH calibration data for the same kinetic parameter.

15. The method of claim 14, wherein the kinetic parameter is current.

16. The method of claim 15, wherein measuring the current comprises imposing a constant cathodic overpotential on the working electrode.

17. The method of claim 15, wherein measuring the current comprises: (a) imposing an anodic overpotential followed by a cathodic overpotential on the working electrode and measuring a ratio of an anodic current to a cathodic current; or (b) imposing a cathodic overpotential followed by an anodic overpotential on the working electrode and measuring a ratio of a cathodic current to an anodic current.

18. The method of claim 14, wherein the reference electrode for measuring the pH of each calibration solution is an external pressure balanced reference electrode (EP-BRE) or a flow through reference electrode (FTRE).

19. The method of claim 14, wherein the working electrode, the counter electrode and the pseudo-reference electrode each independently comprise a platinum, a gold, a carbon, a palladium or an iridium sensor.

20. The method of claim 14, wherein the working electrode, the counter electrode and the pseudo-reference electrode each comprise a platinum wire sensor.

21. The method of claim 14, wherein the solution is a slurry comprising iron.

22. The method of claim 14, wherein the solution is a slurry from a pressure oxidation process.

23. The method of claim 14, wherein the solution is at a temperature between about 25° C. and about 230° C.

24. The method of claim 14, wherein the kinetic parameter is charge transfer resistance.

* * * * *